(12) United States Patent
Yasuda

(10) Patent No.: US 11,570,426 B2
(45) Date of Patent: Jan. 31, 2023

(54) COMPUTER-READABLE NON-TRANSITORY STORAGE MEDIUM, WEB SERVER, AND CALIBRATION METHOD FOR INTERPUPILLARY DISTANCE

(71) Applicants: B.b.designLab Co., Ltd., Tokyo (JP); Kazuhiro Asakura, Sakurai (JP); Logic Meister Inc., Osaka (JP)

(72) Inventor: Yuji Yasuda, Tokyo (JP)

(73) Assignees: B.B.DESIGNLAB CO., LTD., Tokyo (JP); Kazuhiro Asakura, Sakurai (JP); LOGIC MEISTER INC., Sakurai (JP)

( * ) Notice: Subject to any disclaimer, the term of this patent is extended or adjusted under 35 U.S.C. 154(b) by 0 days.

(21) Appl. No.: 17/221,145

(22) Filed: Apr. 2, 2021

(65) Prior Publication Data
US 2021/0235063 A1    Jul. 29, 2021

Related U.S. Application Data

(63) Continuation of application No. 16/679,607, filed on Nov. 11, 2019, now abandoned.

(60) Provisional application No. 62/809,818, filed on Feb. 25, 2019.

(51) Int. Cl.
| | |
|---|---|
| *H04N 13/327* | (2018.01) |
| *H04N 13/344* | (2018.01) |
| *H04N 13/371* | (2018.01) |

(52) U.S. Cl.
CPC ......... *H04N 13/327* (2018.05); *H04N 13/344* (2018.05); *H04N 13/371* (2018.05); *H04N 2213/001* (2013.01); *H04N 2213/002* (2013.01)

(58) Field of Classification Search
CPC .............. H04N 13/237; H04N 13/371; H04N 2213/001; H04N 2213/002; H04N 13/327; H04N 13/344
See application file for complete search history.

(56) References Cited

U.S. PATENT DOCUMENTS

| | | | |
|---|---|---|---|
| 10,242,504 B2 * | 3/2019 | Li | G02B 27/0172 |
| 2014/0029838 A1 * | 1/2014 | Tsubaki | H04N 13/398 |
| | | | 382/154 |
| 2016/0349837 A1 * | 12/2016 | Miller | H04N 13/111 |
| 2017/0221273 A1 * | 8/2017 | Haseltine | A63F 13/25 |
| 2019/0250705 A1 * | 8/2019 | Zhang | G06F 3/0304 |

(Continued)

FOREIGN PATENT DOCUMENTS

| | | | |
|---|---|---|---|
| EP | 3109734 A1 * | 12/2016 | G02B 27/0093 |
| WO | 2016/069398 | 5/2016 | |

*Primary Examiner* — Maria E Vazquez Colon
(74) *Attorney, Agent, or Firm* — Lex IP Meister, PLLC

(57) ABSTRACT

An object of the present invention is to obtain calibration data more easily in a VR (Virtual Reality) device. a user wearing a pair of VR goggles visually recognizes overlapped marker images displayed in the 360-degree VR space, and a stationary state is detected when the images for right and left eyes are overlapped, and when the stationary state satisfies a predetermined condition set in advance, one of the plurality of marker images displayed on the display in this state, which is at the center, is set as a marker image for calibration setting, calibration data of the interpupillary distance based on the marker image for calibration setting having been set is acquired, and the acquired calibration data is set as calibration data used for subsequent reproduction of images.

10 Claims, 17 Drawing Sheets

(56) References Cited

U.S. PATENT DOCUMENTS

2020/0186775 A1* 6/2020 Lin ...................... H04N 13/117
2021/0333868 A1* 10/2021 Sun ........................ G06F 3/013

* cited by examiner

FIG.3
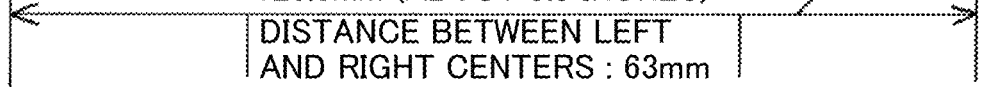
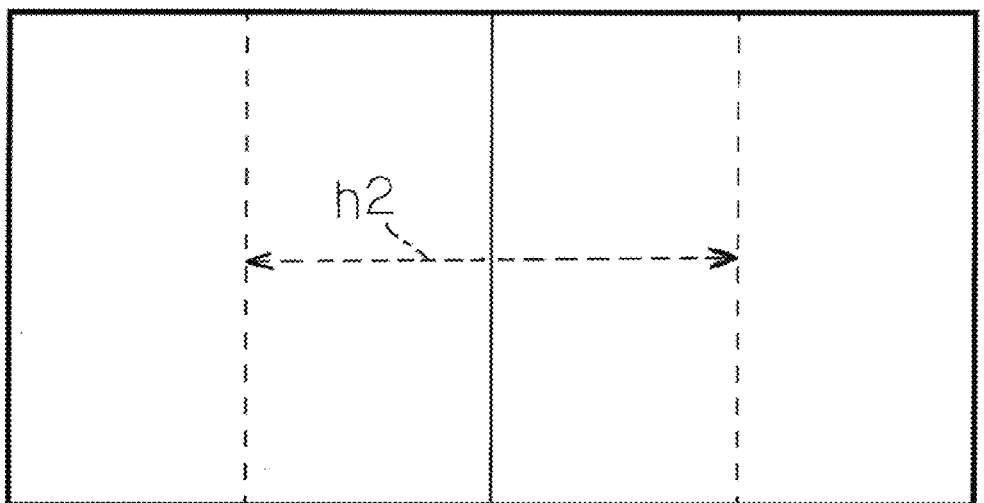
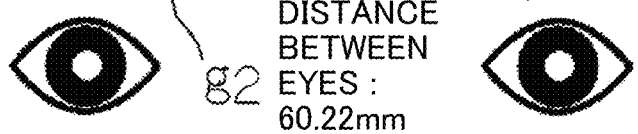

FIG.4
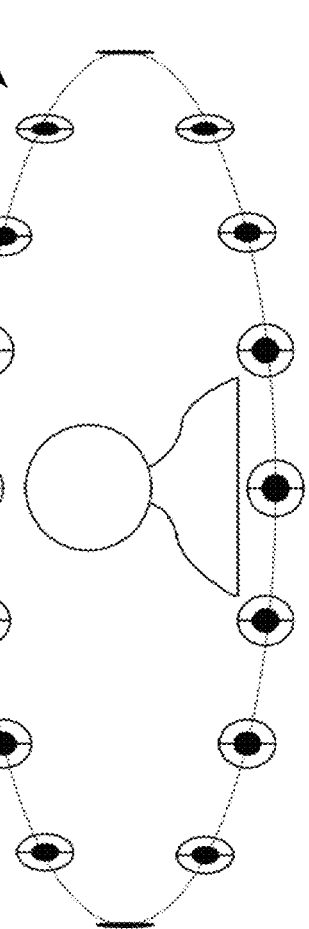
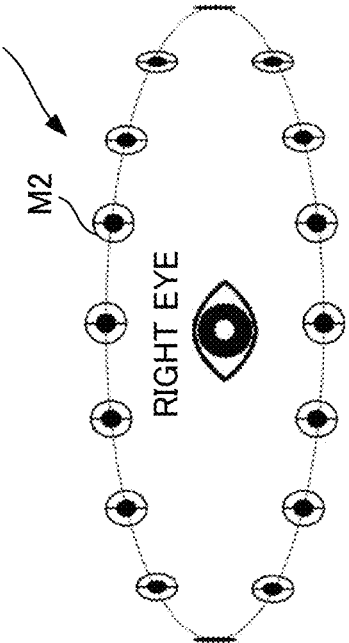
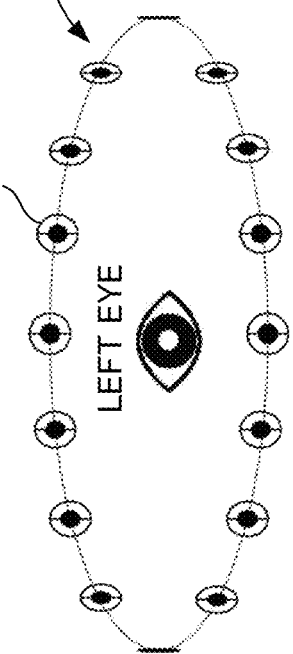

FIG.9
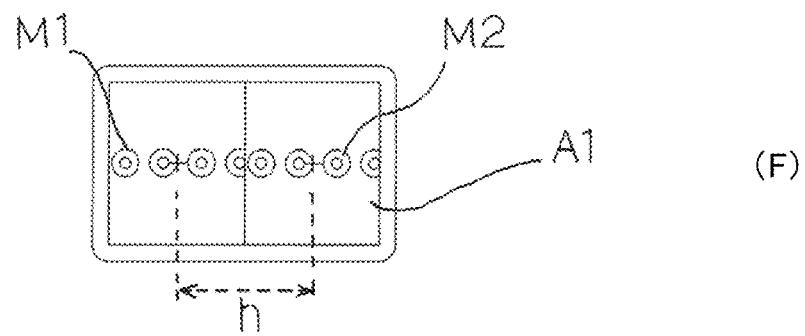
(F)
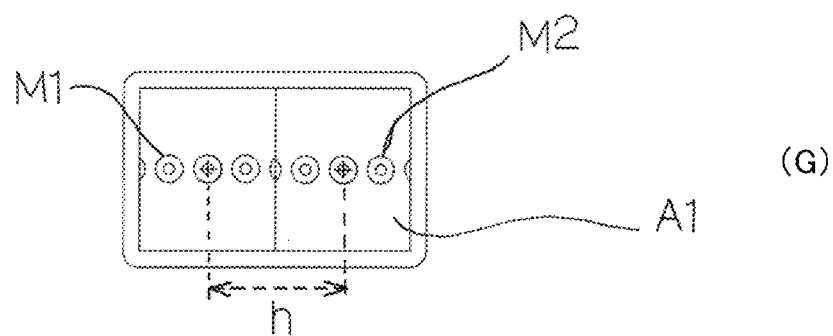
(G)
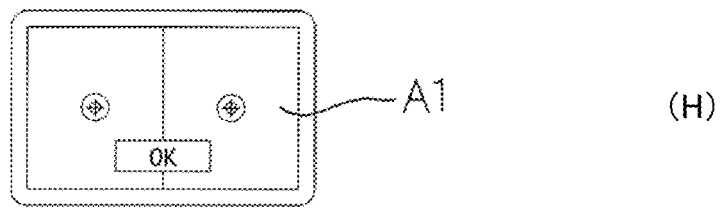
(H)
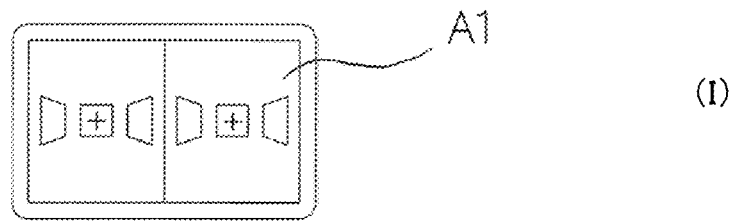
(I)

| SCENE | FOCAL DISTANCE |
|---|---|
| SCENE A | 0.5 m |
| SCENE B | 1.0 m |
| SCENE C | 0.7 m |
| ... | ... |

FIG.16

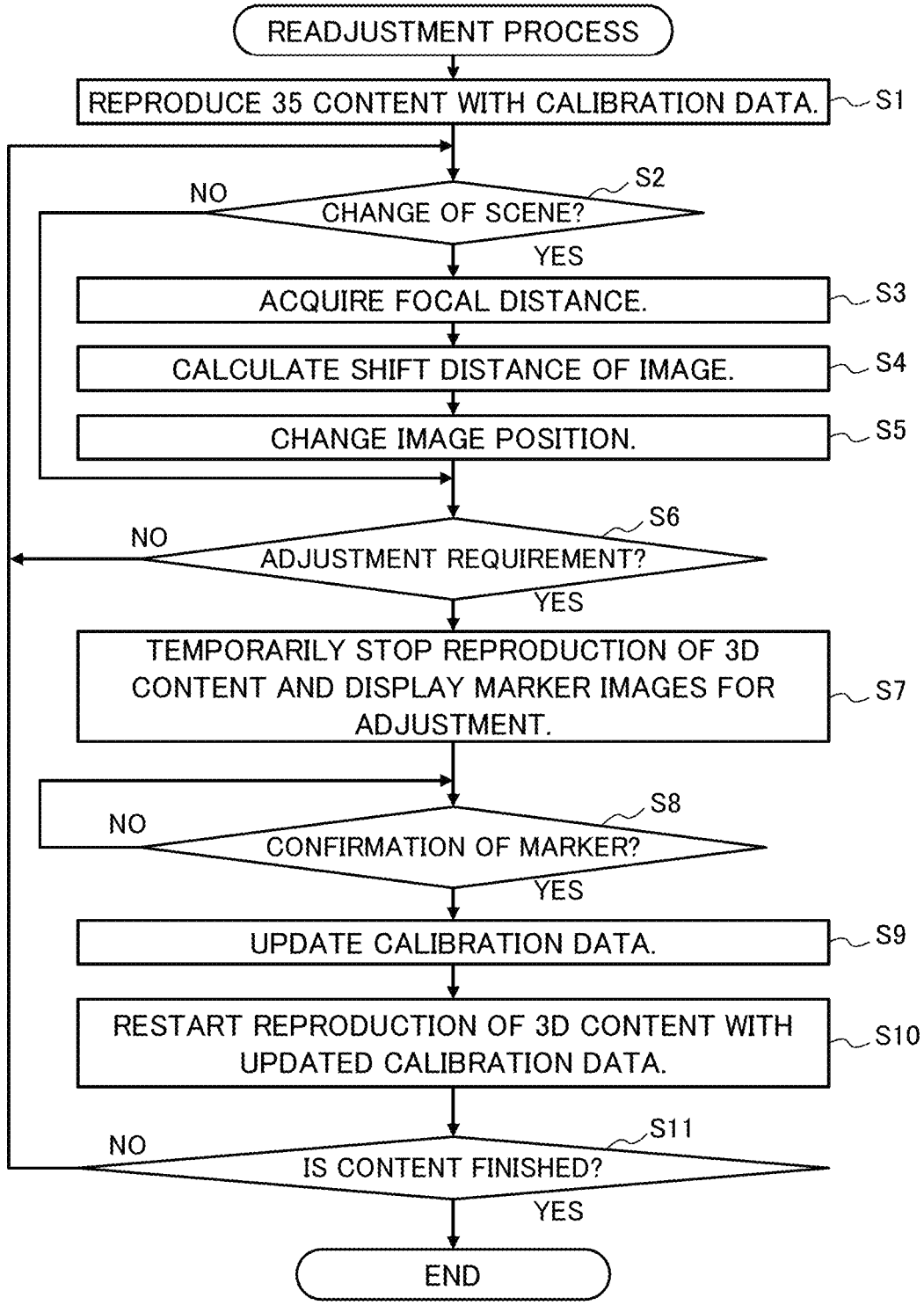

COMPUTER-READABLE NON-TRANSITORY STORAGE MEDIUM, WEB SERVER, AND CALIBRATION METHOD FOR INTERPUPILLARY DISTANCE

CROSS REFERENCE TO RELATED APPLICATIONS

This application is a continuation of U.S. patent application Ser. No. 16/679,607 filed on Nov. 11, 2019 which claims priority to and the benefit of U.S. Provisional Application No. 62/809,818 filed on Feb. 25, 2019. The entire contents of the aforementioned applications are incorporated herein by reference.

BACKGROUND OF THE INVENTION

1. Field of the Invention

The present invention relates to a calibration system and a calibration method of calibration for interpupillary distance which differs from person to person. The system and method are suitable for VR (Virtual Reality). This calibration system and method belong to a technical field related to VR (Virtual Reality) such as a game, a movie, remote operation from a remote location, an endoscopic surgical instrument for a thoracic cavity or an abdominal cavity, an electron microscope, a driving simulator of an automobile, an airplane, and so on.

2. Description of Related Art

For example, claim 4 of International Publication No. WO2016/069398 discloses an interpupillary distance adjusting mechanism by which user's interpupillary distance can be adjusted without taking a head set off from the user's head.

Such a calibration system for interpupillary distance has been a subject of discussion because of possible bad influences on human bodies. The present inventor conceived of the present invention though studies of the following various problems related to calibration.

Behind this development, the present inventor wished to propagate the VR experience to a wider public. However, VR has a structural problem of "strabismus risk", and the use of a twin-lens VR head set is discouraged to children of 13 years old and under, because of legal regulation and safety risk. VR image is a technology to reproduce a perspective by deceiving the brain in such a way that the screen of the same distance is always focused and different images are presented to right and left eyes, respectively. The VR image is an illusion which disguises an image which is not actually 3D (plain image) as a 3D image (three-dimensional image). Since this imposes a burden on the eyes, the following problems arise: "visibility becomes dim to some extent"; "get tired easily"; and "easily get motion sickness because of the distorted image".

There are photoreceptor cells in the retina of a human eye, which take in the light. These cells send signals to the brain through the optic nerve so that visual perception is achieved, and stereoscopic vision cells in the photoreceptor cells are used for stereoscopic vision.

The stereoscopic vision cells gradually develop in the same manner as the development of a human body, and humans are able to see things sterically thanks to the development of these cells. That is, since childhood is a stage in which humans are learning how to use eyes, VR and 3D images may hinder the growth. Therefore, medical personnel advise that children should avoid experiences which impose a burden on the eyes. The ability of stereoscopic vision by binocular parallax is obtained approximately from 2 months old to 2 years old. The ability of stereoscopic vision differs from person to person in the same manner as physical abilities, and it is said that the development of the stereoscopic vision cells is completed by approximately 6 years old.

Other reasons for discouraging the use of VR by children of 13 years old and under are as follows.

High risk of strabismus in childhood (until approximately 6 years old)

Risk due to increase of interpupillary distance (this is not applicable when the distance is adjustable)

Age limit of children under 13 years old set by COPPA

Conservative age setting in consideration of possible tightening of regulations and the occurrence of opposition movement.

As a result of the consideration of these reasons for discouraging the use by children of 13 years old and under, the present inventor thought that, if the interpupillary distance was adjustable and the risk of strabismus could be avoided, children who were at least 7 years old could enjoy the twin-lens VR head set safely. On this account, the present inventor started the development of an application by which the calibration of the interpupillary distance could be easily performed, which was generally difficult. Upon the development, the present inventor paid attention to the points described below to safely view and experience contents with the VR head mounted display which was configured to cause a user to visually recognize a VR image with both of the right and left eyes by displaying a screen for right eye and a screen for left eye. That is, the present inventor thought that the HMD must take account of the interpupillary distance in order not to influence on the development of space perception, including the development of eye balls, and calibration needs to be performed for parallax and deformation (calibration of interpupillary distance) when viewing VR, in order to correspond to the eyes of all people such as women, men, and children, who have different interpupillary distances. Furthermore, the present inventor thought that it was important that software program and a system of the present invention must be application tools by which the calibration could be automatically performed with easy steps and without requiring the user to be conscious of the complicated interrelationship of factors such as the distance between lenses of goggles, the screen size of a smartphone, and the distance between the goggles lenses and the liquid crystal display of the smartphone, in addition to the user's interpupillary distance which is different between individuals.

Furthermore, when developing the present invention, the present inventor paid attention to and researched the current situation of a VR display (synonym for VR goggles) utilizing a mobile device having a flat display with a gyroscope, such as a smartphone.

A pair of VR goggles is different from a VR head mounted display, and VR images can be easily watched by using a pair of VR goggles using a smartphone. The VR head mounted display has the following functions.

Display

Lenses for stereoscopic vision

Necessary sensors (gyro sensor and accelerometer) for performing a head tracking function of tracking the position of a head Meanwhile, a pair of VR goggles originally has the display and the above-described sensors as a function of a smartphone. In this way, the smartphone includes most of the functions necessary for experiencing VR. Although the drawing capability of drawing images on the display is inferior to a PC or a game machine having good graphics performance, the smartphone includes necessary and sufficient processing capabilities. In this regard, to compensate the insufficiency of the graphics performance, a pair of VR goggles typically has a lens for stereoscopic vision.

FIG. 1 shows a principle of a pair of VR goggles B when a smartphone A is set and the pair of VR goggles is used as a head mounted display. In the figure, A1 indicates a liquid crystal screen of the smartphone A, B1 indicates a lens for left eye, and B2 indicates a lens for right eye. Furthermore, in the same figure: a indicates the distance between the outer sides of the right and left lenses B1 and B2; b indicates the distance between the inner sides of the right and left lenses B1 and B2; c indicates the diameter of each of the lenses B1 and B2; d indicates the radius of each of the lenses B1 and B2; e indicates the distance between the centers of the right and left lenses B1 and B2; and f indicates the distance between the lens and the liquid crystal screen A1 which is a screen of the smartphone A. With regard to pairs of goggles for various smartphones, which are currently out on the market, the above-described dimensions a to f are set as described below.

Goggles of Company α: α=85 mm; b=36.5 mm; c=24.25; d=12.125 mm; e=60.75 mm; and f=37 mm. Goggles of Company β: a=98 mm; b=26 mm; c=36 mm; d=18 mm; e=62 mm; and f=37 mm. Goggles of Company γ: a=90 mm; b=42 mm; c=24 mm; d=12 mm; e=66 mm; and f=43 mm. Although there is no description about age limit in the product of Company α, the product of Company β describes that it cannot be used by users of 13 years old and under, and the product of Company describes that it can be used by users of 15 years old and over.

As described above, the distances between lenses of the VR goggles of Company α, β, and γ are as follows: Company α (Cardboard)=60.75 mm; Company β (HOMIDO)=62 mm; and Company γ (no brand name and sold in a 100-yen shop)=66 mm. Based on the measurement of these three pairs of goggles, it was confirmed that the biggest distance difference between the centers of the lenses was 5.25 mm. In this way, the distance between the centers of the lenses differs from goggles to goggles.

Meanwhile, according to the database "Anthropometric Database of Japanese Head 2001", the interpupillary distances are as follows: the minimum value is 55 mm; the maximum value is 71 mm; and the average value is 62.8 mm. It is confirmed that the difference of the interpupillary distance is 16 mm or more. (The Japan Optometric Association unofficially discloses that: the minimum value is 55 mm; the maximum value is 78 mm; and the average value is 63.5 mm.) According to these sets of data, although the manufacturers of goggles adopt Japanese average dimensions with regard to the interpupillary distance g, because the interpupillary distance differs from person to person, the manufacturers cannot design goggles having versatility, in which the centers of lenses, right and left eyes, and the centers of displays for left and right eyes agree to one another.

This problem is partially due to differences in screen sizes of smartphones between makers or products. For example, according to https://www.smartphone-guide.net, screen sizes of 132 models of smartphones which have been released until the end of January of 2018 are as follows: the minimum size is 3.5 inch (the aspect ratio is 5:3); and the maximum size is 6.3 inch (the aspect ratio is 18.5:9). Furthermore, it is also confirmed that the minimum distance between the centers of displays for left and right eyes is 38.1 mm, the maximum distance is 72 mm, and the difference in distance between screen centers is 33.9 mm.

An object of the present invention is to provide: a calibration program for interpupillary distance, which is able to conform to the interpupillary distance g of each user in consideration of the above-described differences of each dimension between goggle products and divergence of screen sizes of smartphones; a calibration method; and a system using the above-described program.

FIG. 2 shows each dimension when a pair of VR goggles, to which a smartphone of MO-01J by NTT DOCOMO, INC is attached, is mounted to the head of a human body. In the figure, h1 is the distance between the center positions of displays for left and right eyes, f1 is the distance between lenses and a liquid crystal display, e1 is the distance between the lenses of the pair of VR goggles, and g1 is the distance between the eyes. Those reference symbols in FIG. 1 ending with "1" indicate parts which are the same part but are different in dimension.

FIG. 3 shows each dimension when a pair of VR goggles, to which a smartphone "Galaxy (registered trademark) S7" by NTT DOCOMO, INC is attached, is mounted to the head of a human body. In the figure, h2 is the distance between the center positions of displays for left and right eyes, f2 is the distance between lenses and a liquid crystal display, e2 is the distance between the lenses of the pair of VR goggles, and g2 is the distance between the eyes. Those reference symbols in FIG. 1 ending with "1" indicate parts which are the same part but are different in dimension.

FIG. 2 and FIG. 3 show a principle when the product of the above Company α (Cardboard) is used. The pair of VR goggles is made of cardboard boxes, and can be purchased from Google. Through analysis, the present inventor concluded that the overview of the functions of the VR goggles is as follows.

mobileVR_IPD="63.5"Äb0

Interpupillary distance (IPD) is set in millimeters (mm).

mobileVR_lens_fov="96" Äb0

Vertical field (degree)

mobileVR_lens_dist="0.6" Äb0

Degree of distortion of lenses

Value: 0.0 to 5.0, 0.0=No distortion

This distortion is applied for rendering as an internal parameter of distortion of fish-eye view, in a one-path rendering step.

mobileVR_lens_dist2="1|0|0|0" Äb0

This is applied to a step of adjusting lens distortion after a 2-path rendering process.

This can be used for applying additional distortion when the use of only the mobileVR_lens_dist setting is not enough to meet the requirement.

When an image is zoomed in a process of applying the distortion parameter, the image quality may be a little deteriorated because of scaling and complementation.

There are four distortion parameters:

mobileVR_lens_dist2="k1|k2|k3|k4"

In this model of distortion of lenses, a calculation formula is shown as below. (r=distance from the center of the lens)_r=r*(1.0/k1)*(1.0+k2*r2+k3*r4+k4*r6) This distortion needs additional GPU processing capability, with the result that the frame rate may be decreased. When a default value "1101010" is used, this step is skipped.

SUMMARY OF THE INVENTION

A calibration program of the present invention stored in a computer-readable non-transitory storage medium is a calibration program of interpupillary distance for executing calibration of the interpupillary distance which differs from person to person by an image processor provided in a pair of VR goggles which is mounted on the head of a human body, the image processor including a sensor for performing a head tracking function and a display, the calibration program:

displaying a plurality of marker images for calibration as images for right eye and images for left eye on the display, the marker images for right eye being slightly deviated respectively from the marker images for left eye in a 360-degree VR space;

displaying the images for right eye and the images for left eye in a scrolling manner in the 360-degree VR space on the display, based on a movement detection signal from the sensor;

detecting a stationary state of the image processor based on the movement detection signal of the sensor, setting one of the plurality of marker images displayed on the display, which is at the center, as a marker image for calibration setting, when the stationary state satisfies a condition (steady stare time) set in advance, and setting calibration data of interpupillary distance based on the marker image for calibration setting having been set; and after the setting by the calibration data setting unit, displaying, on the display, an image for right eye and an image for left eye, which are for reproduction and based on the calibration data having been set.

According to this invention, a plurality of marker images for calibration are displayed as images for right eye and images for left eye on the display, the marker images for right eye being slightly deviated respectively from the marker images for left eye, and a user wearing a pair of VR goggles visually recognizes overlapped marker images displayed in the 360-degree VR space, and a stationary state is detected when the images for right and left eyes are overlapped, and when the stationary state satisfies a predetermined condition set in advance, one of the plurality of marker images displayed on the display in this state, which is at the center, is set as a marker image for calibration setting, calibration data of the interpupillary distance based on the marker image for calibration setting having been set is acquired, and the acquired calibration data is set as calibration data used for subsequent reproduction of images. With this arrangement, the adjustment of the interpupillary distance can be achieved by software.

The calibration data program is preferably executed not by an application of a smartphone but by a web server, in consideration of fine adjustment, prompt application to a pair of VR goggles or a new terminal device, etc.

On this account, a controller of a web server is provided to execute a calibration program of interpupillary distance to execute the below-described processes, in order to obtain calibration data of the interpupillary distance of a user who operates a terminal, through bidirectional communication with the terminal which includes a sensor for achieving a head tracking function and a display and has an image processing function.

The controller executes the processes of:

(a) displaying a plurality of marker images for calibration as images for right eye and images for left eye on the display, the marker images for right eye being slightly deviated respectively from the marker images for left eye in a 360-degree VR space;

(b) displaying the images for right eye and the images for left eye in a scrolling manner in the 360-degree VR space on the display, based on a movement detection signal from the sensor;

(c) detecting a stationary state of the image processor based on the movement detection signal of the sensor, and determining whether the stationary state satisfies a condition set in advance;

(f) setting one of the plurality of marker images displayed on the display, which is at the center, as a marker image for calibration setting;

(g) setting calibration data of interpupillary distance based on the marker image for the calibration setting having been set; and (h) storing the calibration data in association with an ID of the terminal or a user so as to be used for adjusting images for right eye and images for left eye for reproduction, which are used in subsequent VR video reproduction.

A calibration program of the present invention stored in a computer-readable non-transitory storage medium is a calibration program of interpupillary distance for executing calibration of the interpupillary distance which differs from person to person by an image processor provided in a pair of VR goggles which is mounted on the head of a human body, the image processor including a sensor for performing a head tracking function and a display, the calibration program comprising:

a storage unit which stores in advance a plurality of images for left and right eyes for calibration, which are respectively arranged at positions slightly deviated;

an image display unit which displays the images stored in the storage unit on the display as images for right eye and images for left eye; and a calibration data setting unit which sets, for the display, a pair of images selected from the images for right eye and the images for left eye as images for calibration setting, and sets calibration data of the interpupillary distance based on the images for the calibration setting, after the setting by the calibration data setting unit, the image display unit displaying, on the display, an image for right eye and an image for left eye, which are for reproduction and based on the calibration data having been set.

A calibration method of interpupillary distance of the present invention is a calibration method for executing calibration of the interpupillary distance which differs from person to person by an image processor provided in a pair of VR goggles which is mounted on the head of a human body, the image processor including a sensor for performing a head tracking function and a display, the calibration method comprising the steps of:

storing in advance a plurality of images for left and right eyes for calibration, which are respectively arranged at positions slightly deviated;

displaying the images stored in the storage unit on the display as images for right eye and images for left eye so that the images are selectable by a user wearing the pair of VR goggles; and setting, for the display, a pair of images selected by the user from the images for right eye and the images for left eye as images for calibration setting, and setting calibration data of the interpupillary distance based on the images for the calibration setting; and based on the calibration data having been set, displaying, on the display, an image for right eye and an image for left eye, which are for reproduction.

According to this invention, a plurality of marker images for calibration are displayed as images for right eye and images for left eye on the display, the marker images for right eye being slightly deviated respectively from the marker images for left eye, and when the user finds clearly overlapped markers among the marker images displayed at the center of the display, by rotating his/her head in the 360-degree rotational direction and by utilizing the head tracking function, and the marker image, which is at the center, is set as calibration data for adjustment. In images subsequently displayed in the VR space, the adjustment of the interpupillary distance which varies from person to person and depending on age is achieved by software, based on the calibration data.

BRIEF DESCRIPTION OF THE DRAWINGS

FIG. 3 shows each dimension when a pair of VR goggles, to which a smartphone "Galaxy (registered trademark) S7" by NTT DOCOMO, INC is attached, is mounted to the head of a human body. In the figure, h1 is the distance between the center positions of displays for left and right eyes, f1 is the distance between lenses and a liquid crystal display, e1 is the distance between the lenses of the pair of VR goggles, and g is the distance between the eyes.

FIG. 4 is a conceptual diagram showing the arrangement of marker images for calibration setting around a pair of VR goggles, and showing a state in which a group of marker images for left eye and a group of marker images for right eye are perceived by the user as three-dimensional marker images, thank to parallax.

FIG. 9 is a processing flow indicated by screen transition.

FIG. 16 illustrates a focal distance table.

FIG. 17 is a flowchart of a readjustment process executed by a calibration system.

DETAILED DESCRIPTION OF THE INVENTION (Concept of Calibration of Interpupillary Distance with Pair of VR Goggles)

In FIG. 4, a marker arrangement conceptual diagram 41 is a conceptual diagram showing a state in which marker images for calibration setting are arranged around a pair of VR goggles. Marker images of the marker arrangement conceptual diagram 41 show a state in which a user sterically recognizes a group of marker images for left eyes 42 and a group of marker images for right eyes 43 as three-dimensional images in his/her brain, thanks to parallax. That is, a marker image M in the marker arrangement conceptual diagram 41 is a virtual realty image formed by synthesizing a marker image M1 for left eye and a marker image M2 for right eye in the brain.

Figure 5:
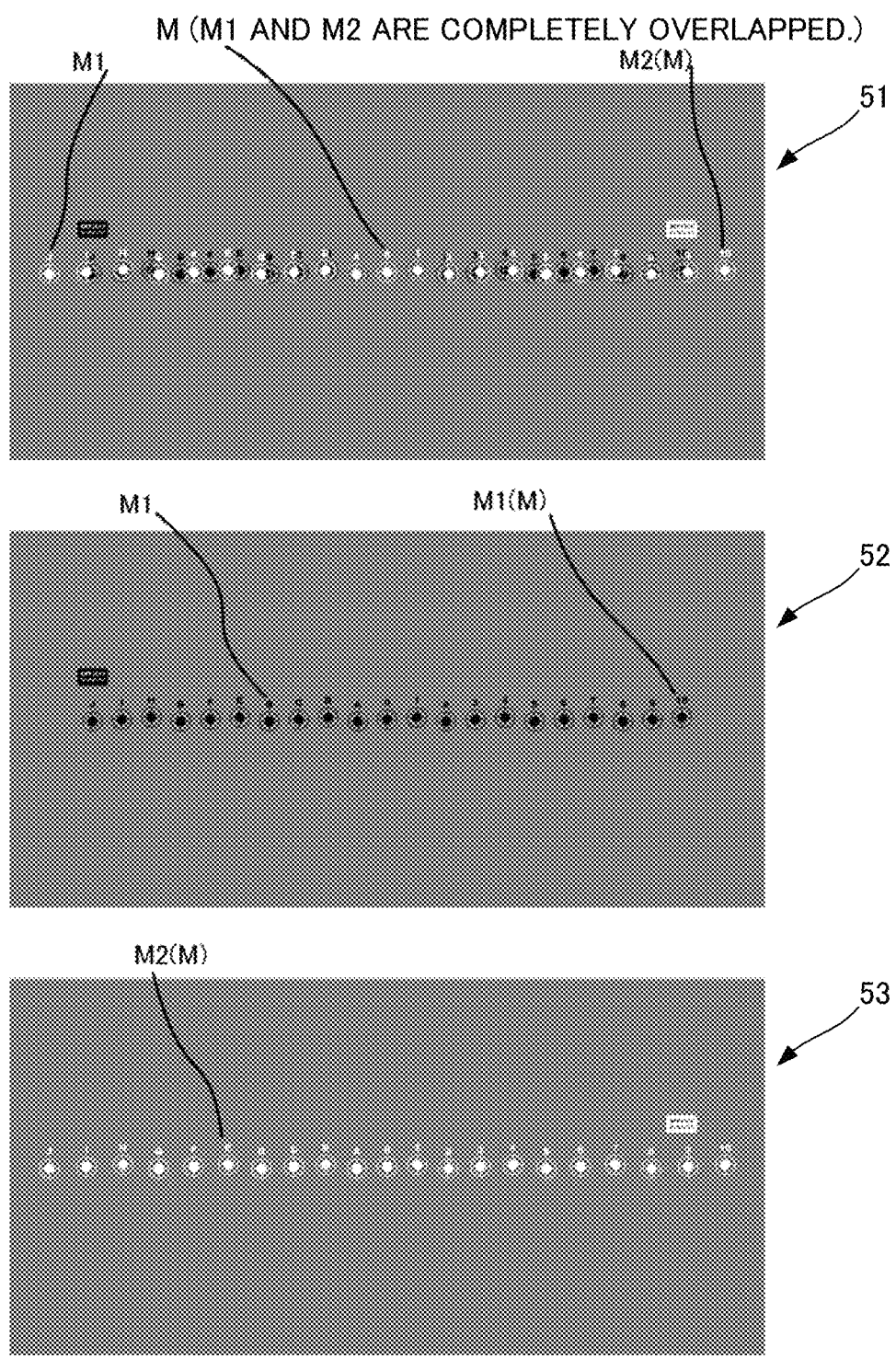
FIG. 5 is a conceptual diagram in which the conceptual diagram of FIG. 4 is shown two-dimensionally.

FIG. 5 two-dimensionally shows FIG. 4. A marker arrangement diagram 51 shows an actual image perceived by the user wearing the pair of VR goggles. A marker image group 52 for left eye is an image viewed exclusively by the left eye of the user wearing the pair of VR goggles, whereas a marker image group 53 for right eye is an image viewed exclusively by the right eye of the user wearing the pair of VR goggles. When the marker images for left and right eyes are visually overlapped in the user's brain in order to figure out the interpupillary distance and obtain calibration data for calibration of interpupillary distance (IPD), the marker images for left and right eyes are viewed to be slightly deviated in the left-right direction so that how the images are visually recognized, i.e., which marker images are overlapped is different depending on the IPD which is different from person to person or in age.

When the user finds clearly matched marker images for left and right eyes in the deviated marker images for left and right eyes and the continuation of a stationary state for a predetermined time set by a later-described timer in the smartphone is detected, it is determined that the marker image (marker image "0" in the figure) which is displayed at the center is selected. Then, a VR image controller sets calibration data of interpupillary distance prepared in advance for the selected marker image, as reference data for displaying subsequent VR images. In some cases, a controller including a CPU of a smartphone functions as the VR image controller. However, as in the present embodiment, a controller of a server which is connected to the smartphone via a communication line is able to function as the VR image controller. In the latter case, marker images for left and right eyes to be displayed on the display of the smartphone are generated on a browser and are displayed on the display of the smartphone.

A marker image for left eye is indicated by a reference symbol M1, and a marker image for right eye is indicated by a reference symbol M2. These images are collectively indicated by a reference symbol M. The marker image "0" indicates a state in which M1 and M2 are completely overlapped. When there is no deviation between the images, the images are represented as if they are alternately displayed. This is because, when, for example, M1 and M2 are different in color, it is not possible to understand for the user whether the images are completely overlapped or only the marker M which is preferentially displayed is displayed. The marker images M1 and M2 for left and right eyes are therefore alternately displayed.

Figure 1:
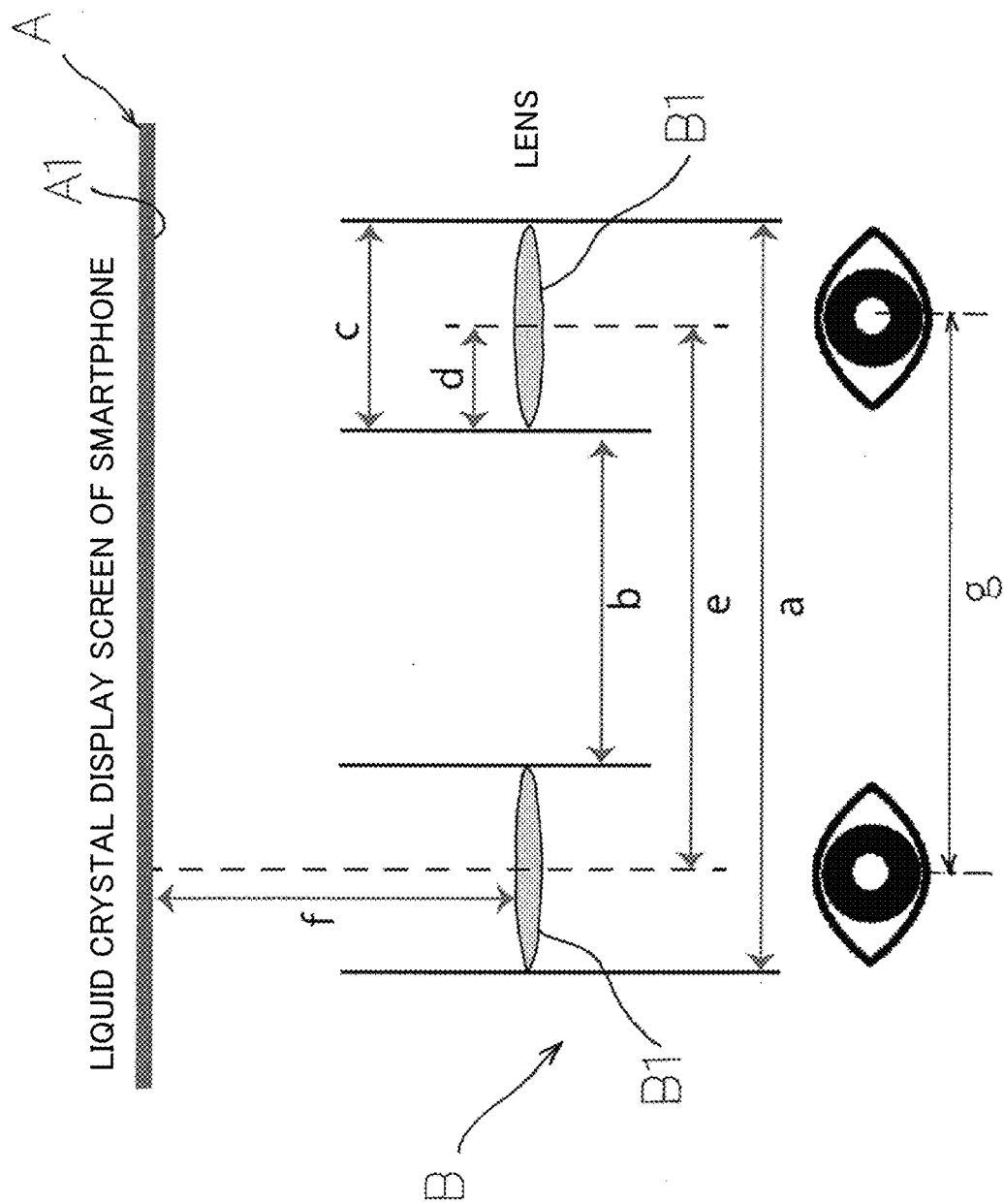
FIG. 1 shows a principle of viewing with a pair of VR goggles B which is a known product, when a smartphone A is set and the pair of VR goggles B is used as a head mounted display.
Figure 2:
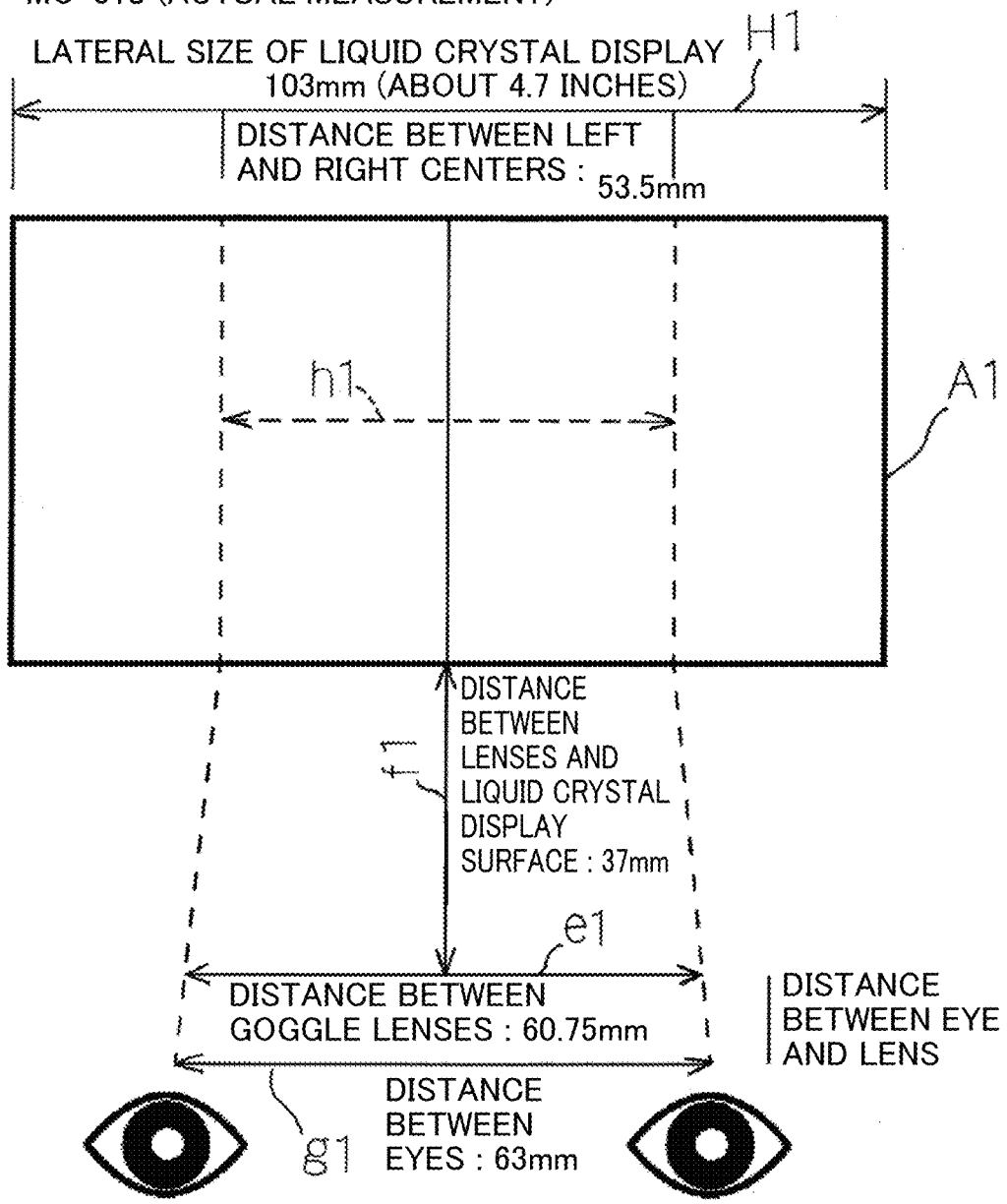
FIG. 2 shows each dimension when a pair of VR goggles, to which a smartphone of MO-01J by NTT DOCOMO, INC is attached, is mounted to the head of a human body. In the figure, h1 is the distance between the center positions of displays for left and right eyes, f1 is the distance between lenses and a liquid crystal display, e1 is the distance between the lenses of the pair of VR goggles, and g is the distance between the eyes.
Figure 6:
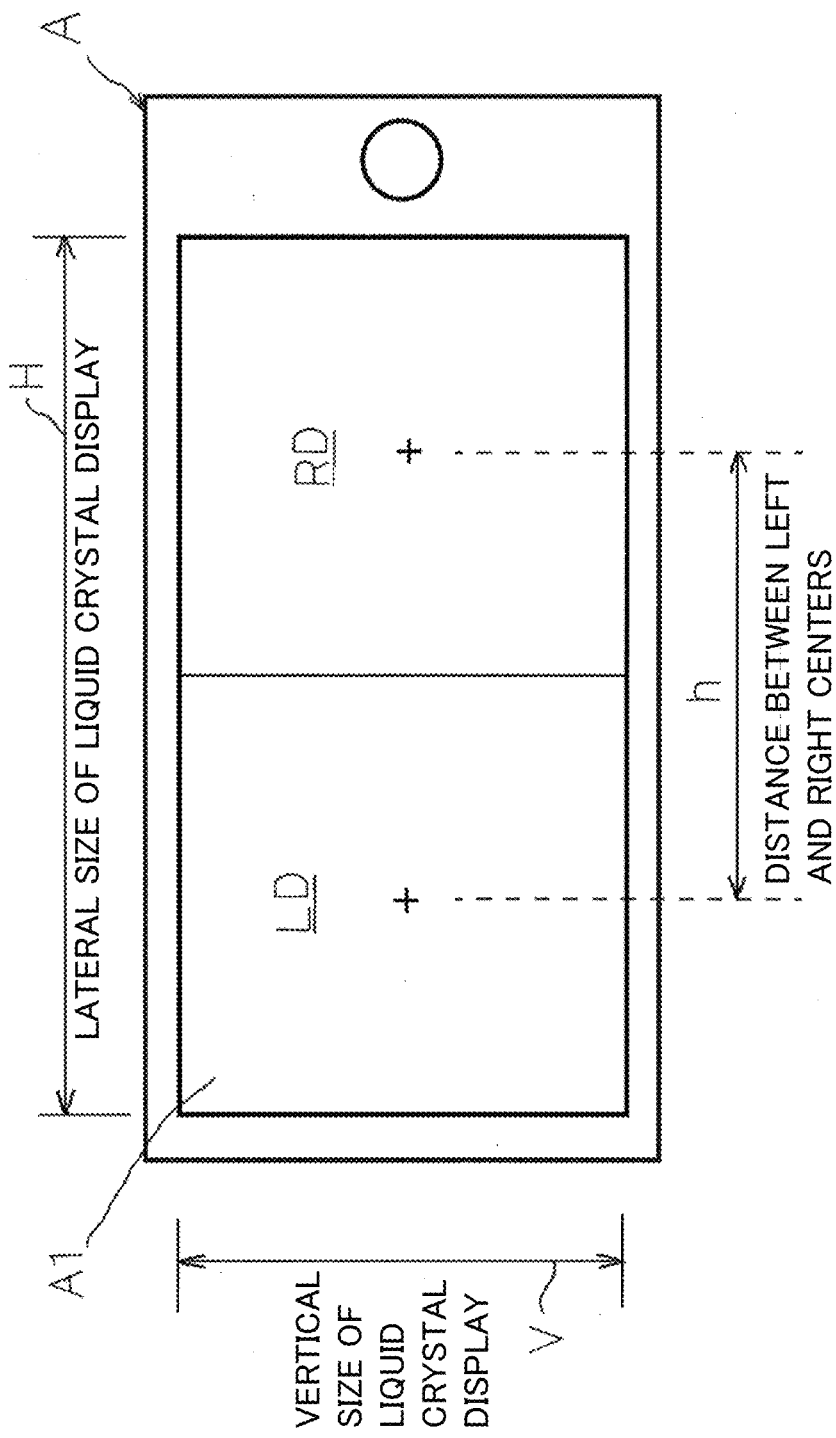
FIG. 6 shows a liquid crystal display which is a display of a smartphone.

FIG. 6 shows a display of a smartphone, and in the figure: H indicates a liquid crystal display size in the width direction; V indicates a liquid crystal display size in the length direction; LD indicates an image for left eye in which marker images for left eye are displayed; RD indicates an image for right eye in which marker images for right eye are displayed; and with regard to reference symbols which have the same meaning as the reference symbols of FIG. 1, e.g., the distance h between the center positions of images for left and right eyes, the same reference symbols as FIG. 1 are used.

(Conceptual Diagram of System)

Figure 7:
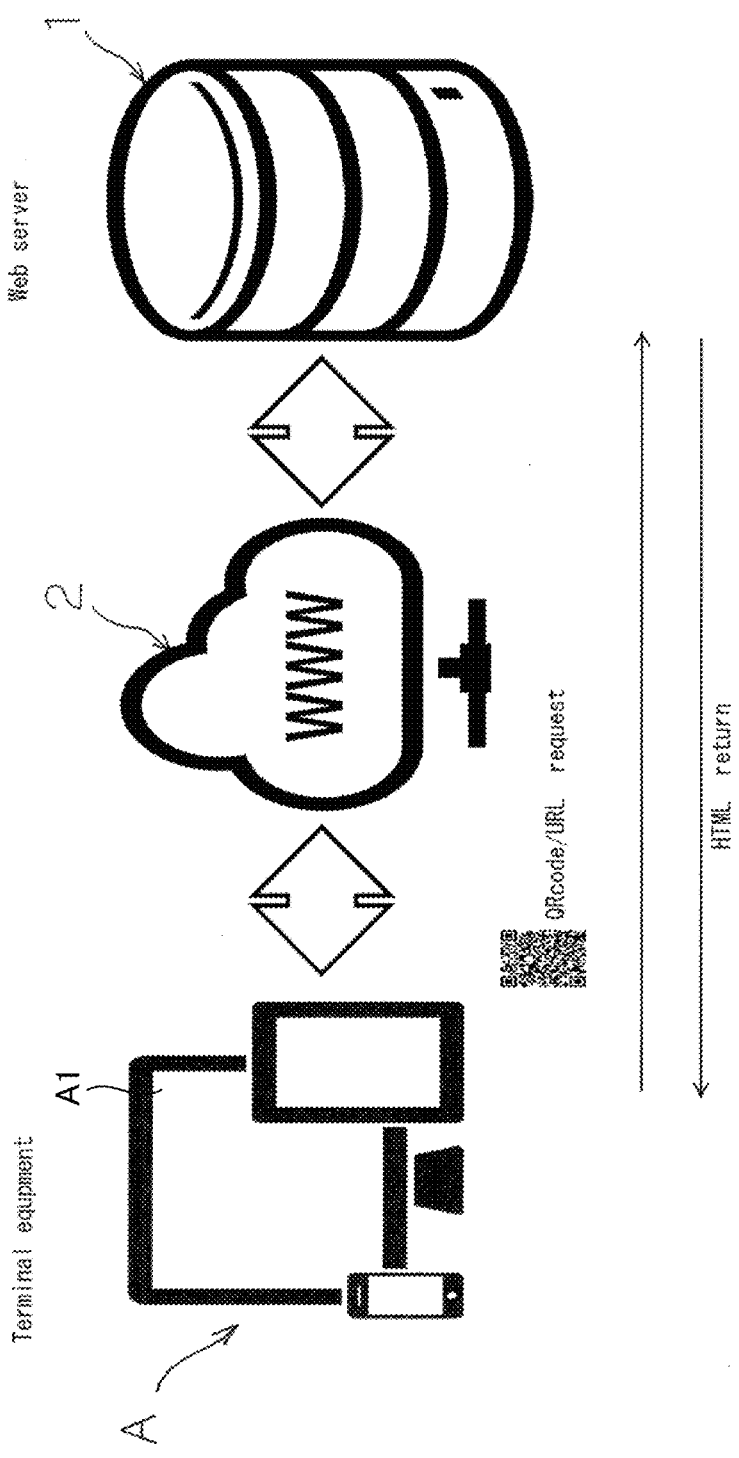
FIG. 7 is a conceptual diagram in which the above-described marker images for left and right eyes from a web server 1 on the web are displayed on a display A1 of a smartphone A which is a terminal, in order to obtain calibration data for the interpupillary distance.

FIG. 7 is a conceptual diagram in which the above-described marker images for left and right eyes from a web server 1 on the WEB are displayed on a display A1 of a smartphone A which is a terminal, in order to obtain calibration data for the interpupillary distance of the present invention. In the diagram, the smartphone A as a terminal requests a QR code and a URL, and accesses the web server via the Internet 2. The above-described marker images for obtaining IPD calibration data are obtained and calibration data is generated based on the marker images, and a 360-degree VR video for which the calibration has been done is obtained, without using application software stored in the memory of the terminal A. The marker images and the VR video are sent from the web server 1 and directly displayed on a browser of the terminal A, as HTML.

The terminal is not limited to the smartphone. The terminal may be a tablet terminal, etc. which allows the user to perform the operation for obtaining calibration data for left and right eyes as in the present embodiment, as a matter of course.

(Processing Flow)

Figure 8:
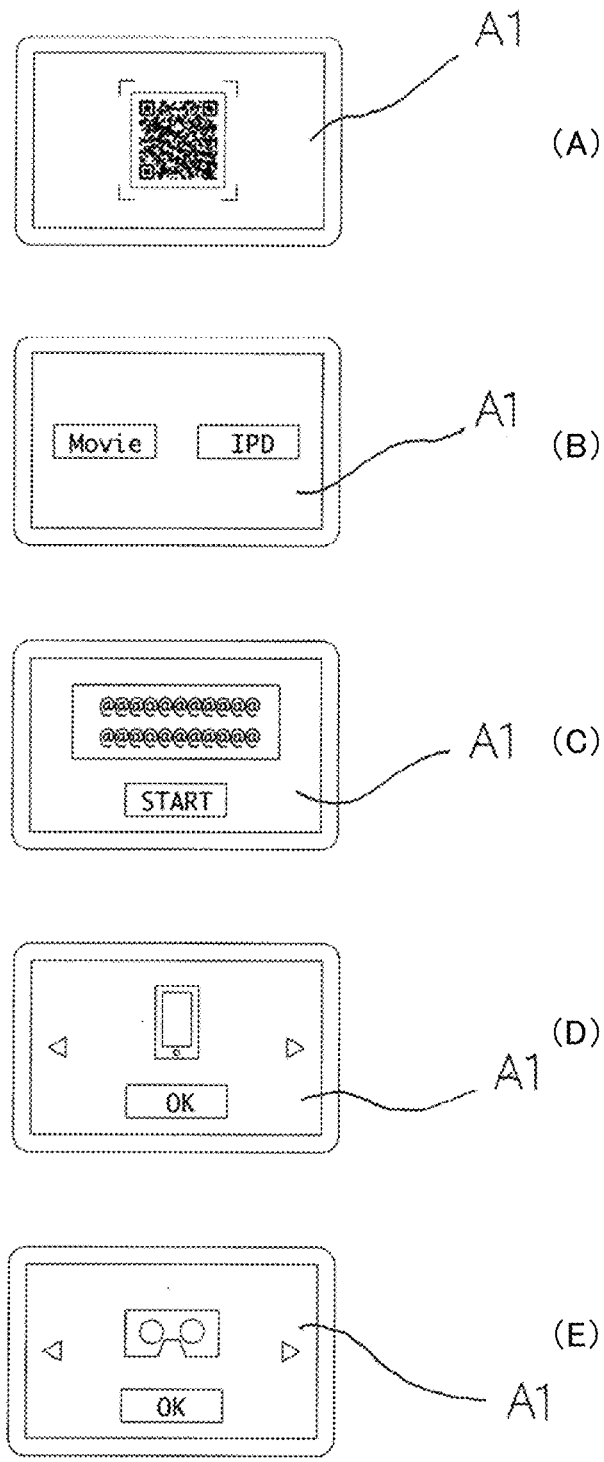
FIG. 8 is a processing flow indicated by screen transition.

FIG. 8 and FIG. 9 are processing flows indicated by screen transition.

(A) Access the web server 1 by a QR code or URL, using the terminal A such as a smartphone. In FIG. 8(A), a display A1 shows a QR code photographed by a camera function of the smartphone.

(B) In HTML, a TOP screen (later-described selection screen shown in FIG. 8(B)) sent from the web server 1 is displayed on a browser on the display A1 of the terminal A. IPD is selected by using selection buttons for video and IPD calibration. In the selection screen, the user can select either VR video or a process for obtaining calibration data. When the VR video is selected, input data of identification information of the user is obtained, and hence the user is able to watch a VR video which has already been adjusted based on the calibration data of the user, which is stored in advance in the database of the web server 1.

(C) Then an IPD calibration screen is displayed. An operation method is displayed on the screen by a wizard. A so-called operation guide screen is displayed.

(D) IPD calibration screen-1: Selection of smartphone (Information of the terminal is read and the model is automatically selected. However, when an appropriate model is not selected, information of inch size of the screen has to be manually input.)

Figure 10:
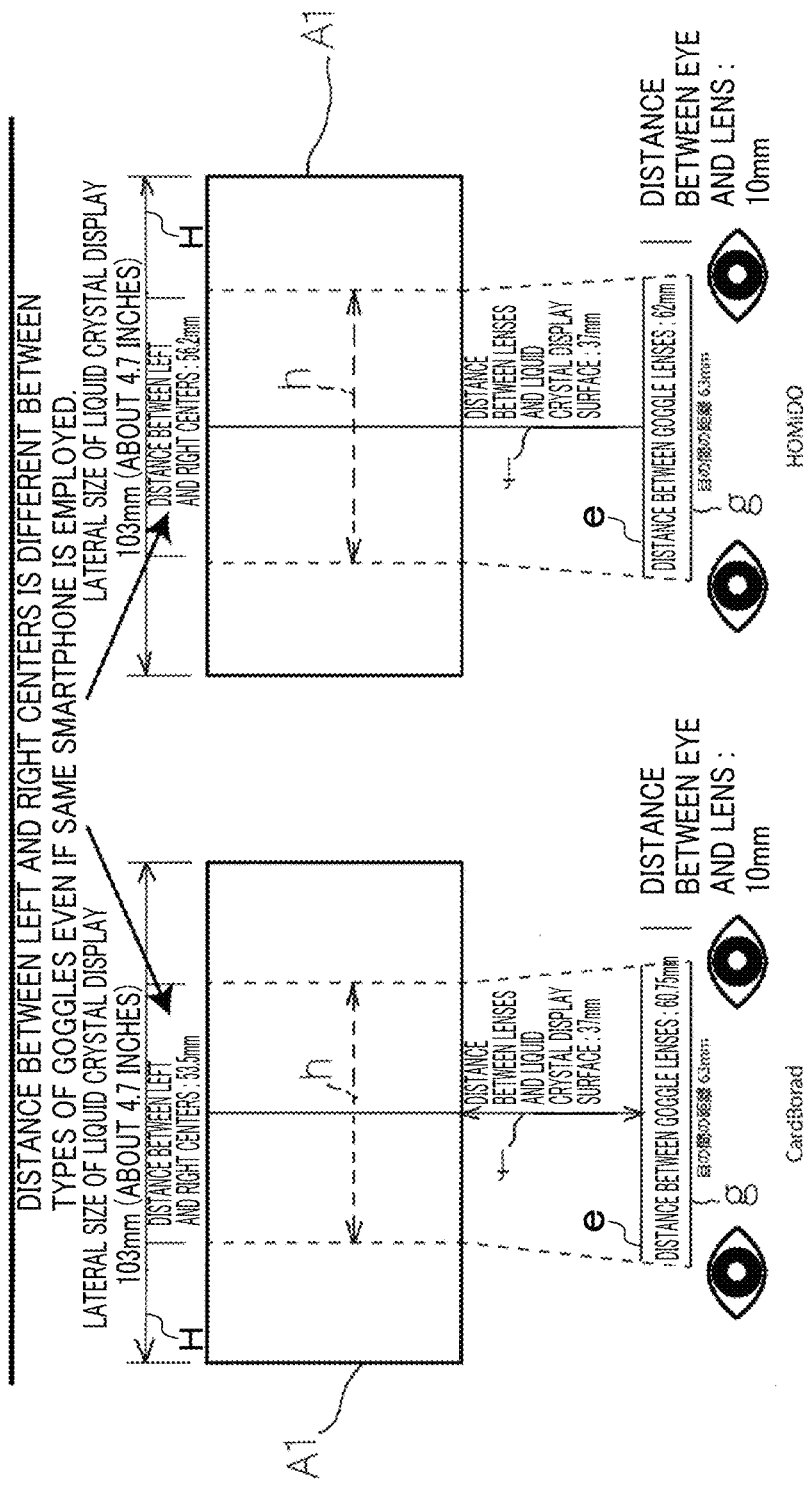
FIG. 10 is a diagram which shows that the distance h between the center positions of displays for left and right eyes differs even when the same smartphone is attached to each pair of VR goggles.

(E) IPD calibration screen-2: Selection of goggles (Select a pair of goggles to be used from a goggles database which is prepared in advance. When an appropriate model is not found in the database, the user performs manual adjustment on a custom screen.) The goggles database is provided in the database of the WEB server. FIG. 10 shows that each distance h between the center positions of images for left and right eyes of the display A1 is different, when the terminals A which are of the same type of smartphones are attached to different pairs of VR goggles. In this way, the distance h between the center positions of displays for left and right eyes of the display A1 differs even though the same terminals A are attached to different types of VR goggles. On this account, by performing a process by which the distance can be set in advance, calibration of interpupillary distance, which is more suited to the user, can be executed.

(F) IPD calibration screen-3: Transition to a selection menu of an object and select an object which has least deviation, from objects which are arranged for user's right and left eyes and are arranged in all directions of 360 degrees around the user. There are various methods for selection. In the present invention, a smartphone is attached to a pair of known general-purpose VR goggles as described above. The pair of VR goggles equipped with the smartphone is attached to and used on a human head. Using a typical sensor of the smartphone A having a gyro function and a timer device serving as a timer capable of detecting elapse of time, a marker image in which a plurality of marker images are clearly displayed is brought to the center by the rotation of the head, and this state is maintained (a stationary state is detected when a predetermined time is measured by the timing device and it is determined that the user has made his/her selection when the stationary state is detected). In this way, calibration data is obtained based on the marker image at the central position. This will be described in a more detail manner in (G) below.

(G) IPD calibration screen-3: The interpupillary distance is obtained in such a way that the user stares an object (an images in which left and right marker images are overlapped; although marker images for left and right eyes are overlapped with each other, what is visually recognized is a single marker image) with the screen A1 being centered, for a certain period of time (view point control). Based on the interpupillary distance, IPD calibration data suited to the user is obtained. Calibration data is widely useable when the interpupillary distance is obtained as a value and this value is used for subsequent reproduction of VR video. However, when only watching a particular VR video suitably is needed, calibration data may not be obtained as a value. A VR reproduction image in which calibration for a marker image (the object described above) stared for a predetermined time at the center of the screen A1 has been completed may be prepared, and this VR reproduction image may be reproduced.

(H) IPD calibration screen-4: On an IPD calibration completion screen, the user checks if right and left images are matched, and the user selects "OK" if there is no problem, and the image display shifts to a video selection screen. When the right and left images are not matched, the user goes back to the calibration screen and makes a selection again.

This process is suitable in cases such as the present embodiment, in which the operation is done by staring an object for a predetermined time and there are many objects to be stared. That is to say, if the calibration data of the interpupillary distance is finely set, images in which the distance between M1 and M1 and the distance between M2 and M2 in the marker images M1 . . . , M1 and M2 . . . , M2 are shortened are prepared for images LD and RD for left and right, as slightly-offset marker images M. In this case, even if the user who wishes to obtain calibration data intends to stare the central position of the screen A1, the controller by which the calibration data is acquired erroneously determines that the user stares another marker image. The process (H) is suitably for solving this problem.

(I) After the completion of the IPD calibration, the image display shifts to a movie selection screen. By performing the above-described processing flow, the invention having the following features can be achieved.

That is, a calibration program of interpupillary distance for executing calibration of the interpupillary distance which differs from person to person by an image processor provided in a pair of VR goggles which is mounted on the head of a human body, the image processor including a sensor for performing a head tracking function and a display, the calibration program:

displaying a plurality of marker images for calibration as images for right eye and images for left eye on the display, the marker images for right eye being slightly deviated respectively from the marker images for left eye in a 360-degree VR space;

displaying the images for right eye and the images for left eye in a scrolling manner in the 360-degree VR space on the display, based on a movement detection signal from the sensor;

detecting a stationary state of the image processor based on the movement detection signal of the sensor, setting one of the plurality of marker images displayed on the display, which is at the center, as a marker image for calibration setting, when the stationary state satisfies a condition (steady stare time) set in advance, and setting calibration data of interpupillary distance based on the marker image for calibration setting having been set; and after the setting by the calibration data setting unit, displaying, on the display, an image for right eye and an image for left eye, which are for reproduction and based on the calibration data having been set.

FIG. 8 and FIG. 9 show a flow of the calibration program. Through the steps performed by the image display unit→the scroll display unit→ and the calibration data setting unit as the processing steps, a setting value set by the calibration data setting unit is used for video reproduction, and the video reproduction is performed.

In the present embodiment, the server includes the following invention. A controller of a web server which executes a calibration program of interpupillary distance in order to obtain calibration data of the interpupillary distance of a user who operates a terminal, through bidirectional communication with the terminal which includes a sensor for achieving a head tracking function and a display and has an image processing function, the controller executing the processes of:

(a) displaying a plurality of marker images for calibration as images for right eye and images for left eye on the display, the marker images for right eye being slightly deviated respectively from the marker images for left eye in a 360-degree VR space;

(b) displaying the images for right eye and the images for left eye in a scrolling manner in the 360-degree VR space on the display, based on a movement detection signal from the sensor;

(c) detecting a stationary state of the image processor based on the movement detection signal of the sensor, and determining whether the stationary state satisfies a condition set in advance;

(f) setting one of the plurality of marker images displayed on the display, which is at the center, as a marker image for calibration setting;

(g) setting calibration data of interpupillary distance based on the marker image for the calibration setting having been set; and (h) storing the calibration data in association with an ID of the terminal or a user so as to be used for adjusting images for right eye and images for left eye for reproduction, which are used in subsequent VR video reproduction.

The above-described process for obtaining and applying the calibration data may be performed at any timing. For example, it may be performed during the reproduction of a VR video. A trigger for obtaining and applying the calibration data is preferably provided during the reproduction of the VR video. For example, such a trigger for obtaining and applying the above-described calibration data may be provided on a setting screen which can be called during the reproduction of a VR video. The VR video is not limited to simple videos. For example, when the invention is applied to consumer game machines or driving simulators, the VR video is, for example, images generated in accordance with inputs to a game controller by a user. Meanwhile, when the invention is applied to endoscopic surgical instrument, electronic microscopes, and the like, the VR video is, for example, images generated by encoding, for 3D, images obtained from an actual camera or a CT (Computed Tomography).

In this way, the calibration system having the terminal A of the present embodiment or the calibration system having the terminal A and the Web server includes a controller which executes the above-described processes. As a matter of course, the terminal A may be a stereoscopic display device such as a head mounted display which makes a user virtually experience stereoscopic vision.

Based on the calibration data of interpupillary distance which is obtained as described above, the controller above linearly adjusts the positions of images for left and right eyes, which are displayed on the display A1 by the terminal A. That is, when a device such as a pair of VR goggles or a head mounted display, in which an average IPD is set for general use as described above, is used by a user having an IPD which is different from the average IPD, the controller moves the images for left and right eyes in a horizontal direction based on the obtained calibration data.

Specifically, the head mounted display has lenses for left and right eyes which are provided to be apart from each other by a distance based on the IPD having been set. A user wearing the head mounted display visually recognizes an image for the right eye with his/her right eye through the lens for the right eye, and visually recognizes an image for the left eye with his/her left eye through the lens for the left eye. For example, when a virtual object which is at a front position and is away from the user by a distance D is stereoscopically shown to the user, an object for right eye is displayed at a position of the display intersecting with the optical axis of the lens for right eye, and an object for the left eye is displayed at a position of the display intersecting with the optical axis of the lens for left eye. With this arrangement, for a user whose IPD is identical with the IPD set to a head mounted display, the focal distance and the convergence distance are consistent with those in a case where an object located at the front position and distanced by the distance D is actually viewed. In this way, the user is able to experience stereoscopic vision naturally to a certain extent.

Meanwhile, in a case where a user having IPD which is narrower than the IPD set to the head mounted display wears the head mounted display and views the same image as above, the right and left eyes shift to the inner side of the optical axes of the lenses. Therefore, the right eye recognizes the object for the right eye at a position offset rightward from the center, whereas the left eye recognizes the object for the left eye at a position offset leftward from the center. To put it differently, for the user with IPD narrower than the IPD set to the head mounted display, although the object is displayed with parallax based on the distance D, the convergence distance is recognized to be longer than the distance D.

In this regard, in the reproduction of VR videos, the controller of the terminal A of the present embodiment shifts an image for right eye leftward and shifts an image for left eye rightward, by the distance based on the obtained calibration data.

Meanwhile, in a case where a user having IPD which is wider than the IPD set to the head mounted display wears the head mounted display and views the same image as above, the right and left eyes shift to the outer sides of the optical axes of the lenses. Therefore, the right eye recognizes the object for the right eye at a position offset leftward from the center, whereas the left eye recognizes the object for the left eye at a position offset rightward from the center. To put it differently, for the user with IPD wider than the IPD set to the head mounted display, although the object is displayed with parallax based on the distance D, the convergence distance is recognized to be shorter than the distance D.

In this regard, in the reproduction of VR videos, the controller of the terminal A of the present embodiment shifts an image for right eye rightward and shifts an image for left eye leftward, by the distance based on the obtained calibration data.

In this way, the controller of the present embodiment is configured to obtain calibration data only by causing the user to select a marker image M1 for left eye and a marker image M2 for right eye, which are visually recognized as matched images for the user, and to display an image for right eye and an image for left eye for reproduction at positions based on the calibration data, on the display. This makes it possible to suppress visually-induced motion sickness, discomfort, and the above-described risks, which are at least partially caused by the disagreement between the IPD set to a stereoscopic display device such as a head mounted display or a VR display attached to a mobile device with a flat display and the IPD of the user who actually wears the display.

The following will describe functional blocks of the calibration system including the terminal A or including the terminal A and the Web server.

Figure 11:
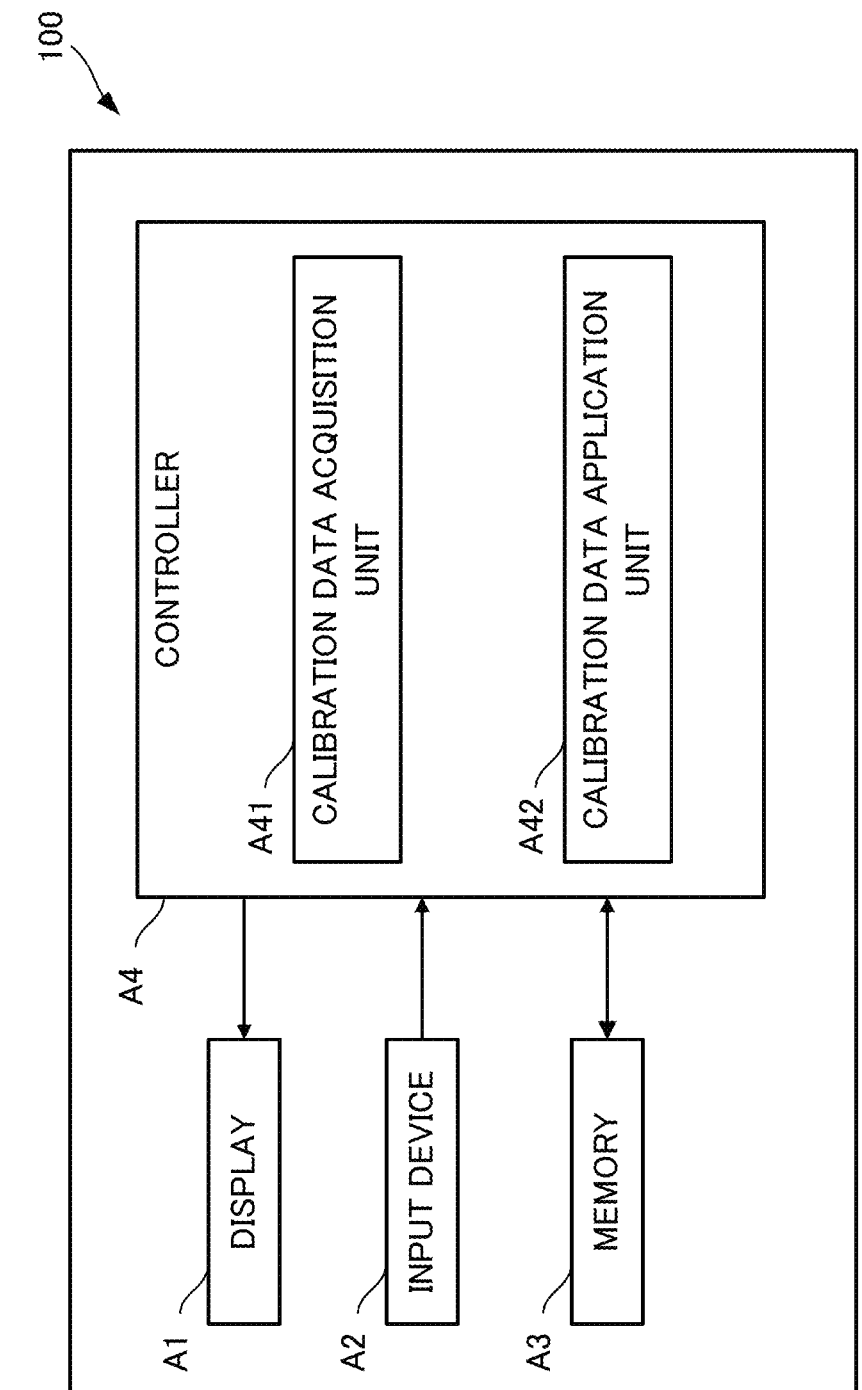
FIG. 11 is a diagram which shows functional blocks of calibration system.

As shown in FIG. 11, a calibration system 100 includes a display A1, an input device A2, a memory A3, and a controller A4. The display A1 displays the above-described marker images M1 for left eye and marker images M2 for right eye, which are used for calibration, and the images for left eye and images for right eye for reproduction, to which the calibration is to be applied. The display A1 may be provided for each of the right and left eyes, or may be a display of a smartphone.

The input device A2 is used by the user to select a marker image M1 for left eye and a marker image M2 for right eye, which are visually matched for the user. For example, when a marker which is stared by the user for a predetermined time is selected as a selection target, the input device A2 is a motion sensor, for example. Alternatively, the input device A2 may be a typical mouse, keyboard, or a game controller.

The memory A3 stores data for image display on the display A1, such as the marker images M1 for left eye and marker images M2 for right eye, which are used for calibration, and the images for left eye and images for right eye for reproduction, to which the calibration is to be applied. Furthermore, the memory A3 stores the above-described calibration program of interpupillary distance. The memory A3 is a computer-readable non-transitory storage medium, and corresponds to, for example, a storage unit built in the head mounted display, a storage unit built in the smartphone, or a storage unit built in the server. When the head mounted display is connected to a computer which outputs VR video for a game, equipment for endoscopic surgery, an electron microscope, a driving simulator, and so on, the memory A3 may be a storage unit built in the computer. In other words, the calibration system 100 may include such a computer.

The controller A4 includes a calibration data acquisition unit A41 which executes a process for acquiring calibration data of interpupillary distance described above and a calibration data application unit A42 which executes a process for applying the calibration data to a video for VR reproduction. The calibration data application unit A42 may be a unit providing calibration data to the above-described computer which outputs VR videos. In this case, the computer applies the calibration data to the videos for VR reproduction. Furthermore, the calibration data application unit A42 may actually apply the calibration data to the VR videos output from the above-described computer.

The following will describe a modification which is executed by a calibration program stored in the calibration system 100 shown in FIG. 11. The modification below describes a method of acquisition of calibration data which is realized by the calibration system 100. The controller A4 of the calibration system 100 of the present modification shows marker images for right eye and marker images for left eye described above one by one, moves them so that the IPD is changed, and acquires the calibration data based on the IPD indicated by the marker image for right eye and the marker image for left eye at a timing selected by the user.

Figure 12:
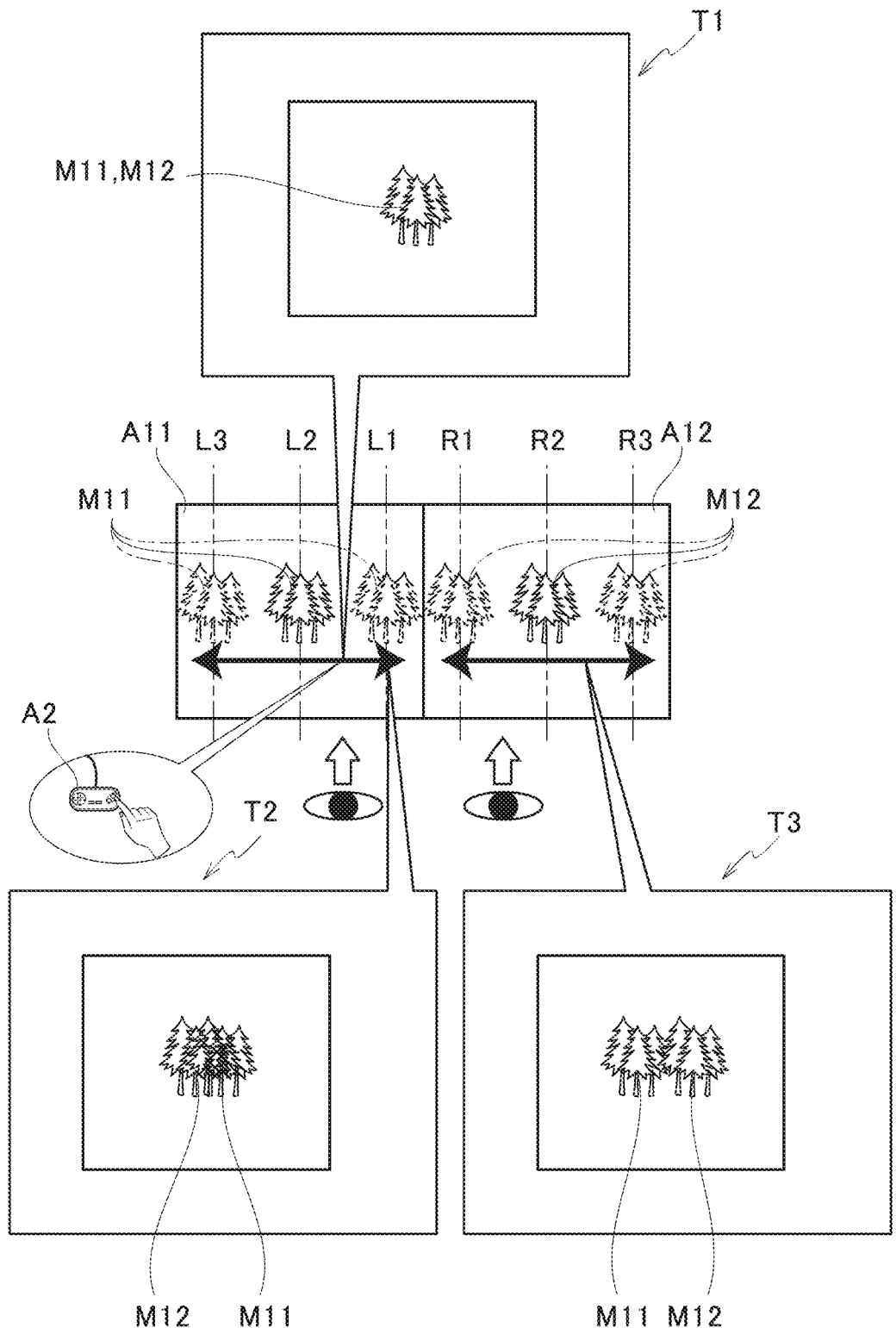
FIG. 12 relates to a modification and shows images displayed on right and left displays and images visibly recognized by a user.

To begin with, a first modification will be described with reference to FIG. 12. As shown in FIG. 12, in the first modification, the controller A4 of the calibration system 100 displays marker images M11 for left eye on a display A11 for left eye, and displays marker images M12 for right eye on a display A12 for right eye. The display A11 and the display A12 may be a single device and correspond to left and right areas, respectively.

Noted that, as shown in FIG. 12, in the present modification, while images of trees with parallax, which are stereoscopically viewable, are used as the marker images M11 for left eye and the marker images M12 for right eye, the marker images are not limited to these images. For example, marker images shown in FIG. 4 and FIG. 5 of the above-described embodiment may be employed, or stereoscopic images such as scenery shown on the entire display A11 and the entire display A12 may be employed. No matter what images are used, standard coordinates are set, for example, at the center of the images.

In the display A11, setting lines L1, L2, and L3 are set to divide the area into left and right. The marker images M11 for left eye are repeatedly displayed while moving between the setting lines L1 to L3. That is, the marker images M11 for left eye move from the setting line L1 to the setting line L3 via the setting line L2, and then move from the setting line L3 to the setting line L1 via the setting line L2. The marker images M1 for left eye repeat these movements. The setting line L2 is at the center of the display A11. In the display A12, setting lines R1, R2, and R3 are provided to divide the area into left and right. The marker images M12 for right eye repeatedly move between the setting lines R1 to R3. That is, the marker images M11 for right eye move from the setting line R1 to the setting line R3 via the setting line R2, and then move from the setting line R3 to the setting line R1 via the setting line R2. The marker images M11 for right eye repeat these movements. The setting line R2 is at the center of the display A12.

The marker images M11 for left eye and the marker images M12 for right eye move in such a way that a marker image M12 for right eye reaches the setting line R1 when a marker image M11 for left eye reaches the setting line L1. Furthermore, the marker images M11 for left eye and the marker images M12 for right eye move in such a way that a marker image M12 for right eye reaches the setting line R3 when a marker image M11 for left eye reaches the setting line L3. In other words, the marker images M11 for left eye and the marker images M12 for right eye repeatedly approach to each other and move away from each other. In this way, the marker images M11 for left eye and the marker images M12 for right eye are displayed in a movable manner in the left-right direction such that the interpupillary distance is changed. In other words, the marker images M11 for left eye and the marker images M12 for right eye are arranged such that the interpupillary distance is changeable.

Therefore, on the setting line L1 side of the setting line L2 and on the setting line R1 side of the setting line R2, the marker images M11 for left eye and the marker images M12 for right eye are suitable for users who have IPD which is narrower than the IPD set to the stereoscopic display such as VR goggles. Meanwhile, on the setting line L3 side of the setting line L2 and on the setting line R3 side of the setting line R2, the marker images M11 for left eye and the marker images M12 for right eye are suitable for users who have IPD which is narrower than the IPD set to the stereoscopic display such as VR goggles.

The calibration system 100 receives an input from the input equipment A2 while the marker images M11 for left eye and the marker images M12 for right eye are moving. The calibration system 100 calculates calibration data in accordance with the positions of the marker images M11 for left eye and the marker images M12 for right eye at the timing of receiving the input, and applies the calibration data to video reproduction positions on the display A11 and the display A12. That is, the calibration system 100 displays the marker images M11 for left eye and the marker images M12 for right eye in such a manner that a user wearing the VR goggles, etc. is able to make selection from possible positions of the marker images M11 for left eye and the marker images M12 for right eye.

For example, when a user having IPD narrower than the IPD set to a stereoscopic display device such as a pair of VR goggles views the marker images M11 for left eye and the marker images M12 for right eye, the user visually recognizes an image (T1) in which the marker image M12 for right eye is matched with the marker image M12 for right eye, at a location between the setting line R1 and R2 (between the setting line L1 and L2). Meanwhile, for example, the IPD is narrower than the IPD of the user at the setting line R1 (L1).

On this account, the marker image M11 for left eye is visually offset rightward and the marker image M12 for right eye is visually offset leftward (T2). Furthermore, for example, the IPD is wider than the IPD of the user at a location between the setting lines R2 and R3 (between the setting lines L2 and L3). On this account, the marker image M11 for left eye is visually offset leftward and the marker image M12 for right eye is visually offset rightward (T3).

Although not shown in the figures, when a user having IPD wider than the IPD set to a stereoscopic display device such as a pair of VR goggles views the marker images M11 for left eye and the marker images M12 for right eye, the user visually recognizes an image in which the marker image M11 for left eye is matched with the and the marker image M12 for right eye such as the image T1, between the setting line R2 and R3 (between the setting line L2 and L3).

As the user performs an input to the input device A2 when visually recognizing an image like T1, the calibration system 100 obtains the calibration data for setting suitable IPD for the user, from the positions of the marker images M11 for left eye and the marker images M12 for right eye when the input is made. The calibration data is, for example, an adjustment value which is determined based on to what degree the coordinates set at the marker image M11 for left eye is deviated from the setting line L2.

The virtual distance at which the marker images M11 for left eye and the marker images M12 for right eye are displayed is not limited, but the distance is preferably set at a distance with which an object which serves as a base of a VR video to be reproduced is provided. The object serving as the base is, for example, an object which is highly frequently viewed by the user in the VR video.

Furthermore, while the marker images M11 for left eye and the marker images M12 for right eye automatically move in the above-described modification, the disclosure is not limited to this arrangement. For example, the marker images M11 for left eye and the marker images M12 for right eye may move in sync in response to an input to the input device A2 by the user, and the positions of the marker images M11 for left eye and the marker images M12 for right eye suitable for the user's IPD may be determined as the user operates the input device A2 when the marker images are at desired positions.

In this way, the controller A4 of the calibration system 100 displays the marker images M11 for left eye and the marker images M12 for right eye, which repeatedly move in the horizontal direction while changing the IPD, on each of the display A11 and the display A12. In this connection, the controller A4 may prompt the user to operate the input device A2 when the marker image M11 for left eye and the marker image M12 for right eye are matched. The controller A4 determines the positions of the marker image M11 for left eye and the marker image M12 for right eye based on the timing of the signal from the input device A2. The controller A4 obtains the calibration data based on the positions of the marker image M11 for left eye and the marker image M12 for right eye. The controller A4 applies the obtained calibration data to the reproduction of a VR video.

While in this modification the controller A4 of the calibration system 100 prompts the user to operate the input device A2 when the marker image M11 for left eye and the marker image M12 for right eye are matched, the disclosure is not limited to this arrangement. In other words, the controller A4 of the calibration system 100 may prompt the user to operate the input device A2 when the marker image M11 for left eye and the marker image M12 for right eye are separated from each other.

This is because there is a possibility that the user moves the eyeballs in an unnatural way so as to compensate the deviation between the marker image M11 for left eye and the marker image M12 for right eye as indicated by T2 in FIG. 12, and visually recognizes the image T1. In other words, there may be a period in which the marker image M11 for left eye and the marker image M12 for right eye are matched in the traveling range of the marker image M11 for left eye and the marker image M12 for right eye.

For example, the controller A4 of the calibration system 100 may obtain the calibration data as described below. Specifically, the controller A4 moves the marker image M11 for left eye from the setting line L1 to the setting line L3 and moves the marker image M12 for right eye from the setting line R1 to the setting line R3, and repeats these movements. During this period, the controller A4 prompts the user to operate the input device A2 when a state in which the marker image M11 for left eye is matched with the marker image M12 for right eye is visually shifted to a state in which the marker image M11 for left eye is separated from the marker image M12 for right eye. The positions of the marker image M11 for left eye and the marker image M12 for right eye at this timing indicate the IPD which is at the outer limit of the adjustment range of the user's eyes.

Furthermore, the controller A4 moves the marker image M11 for left eye from the setting line L3 to the setting line L1 and moves the marker image M12 for right eye from the setting line R3 to the setting line R1, and repeats these movements. During this period, the controller A4 prompts the user to operate the input device A2 when a state in which the marker image M11 for left eye is matched with the marker image M12 for right eye is visually shifted to a state in which the marker image M11 for left eye is separated from the marker image M12 for right eye. The positions of the marker image M11 for left eye and the marker image M12 for right eye at this timing indicate the IPD which is at the inner limit of the adjustment range of the user's eyes.

The controller A4 obtains the calibration data based on the positions of the marker image M11 for left eye and the marker image M12 for right eye at the center between the outer limit and the inner limit of the above-described adjustable range of the user's eyes, with the assumption that the center indicates IPD suitable for the user. With this arrangement, it is possible to further properly display VR videos at a position suitable for user's IPD, and the user may be less likely to feel uncomfortable when the object approaches to the user or moves away from the user.

Figure 13:
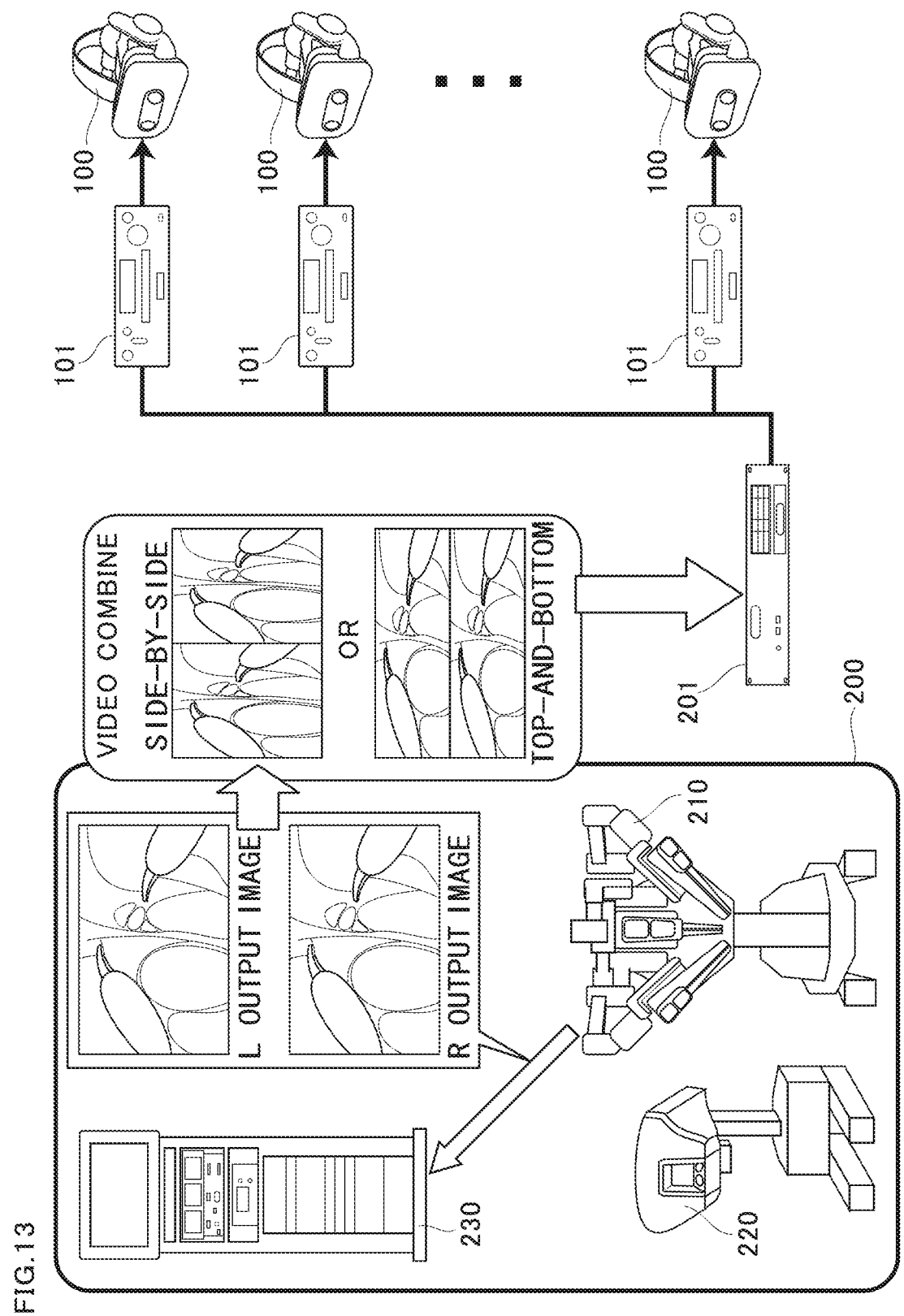
FIG. 13 shows the outline of a second modification.

Now, the following describes a second modification with reference to FIG. 13. The second modification describes an example of how the IPD obtained in the embodiment above or the first modification is used. To be more specific, plural calibration systems 100 and an endoscopic surgery robot system 200 which transmits images reproduced by the calibration systems 100 are provided in this modification.

The endoscopic surgery robot system 200 is a system by which a physician performs endoscopic surgery of a thoracic cavity or an abdominal cavity by using a robotic arm, and includes an endoscopic surgery robot device 210, an operation terminal 220, and a controller 230 to which the endoscopic surgery robot device 210 and the operation terminal 220 are connected. The endoscopic surgery robot system 200 is connected to a 3D real-time encoder 201. The 3D real-time encoder 201 is connected to plural 3D real-time decoders 101 through a network such as a LAN. Each 3D real-time decoder 101 is connected to the calibration system 100.

Main components of the endoscopic surgery robot device 210 are arms and a 3D camera which films images for left eye and images for right eye. Based on a control signal sent from the operation terminal 220 through the controller 230, the endoscopic surgery robot device 210 controls the arms in the progress of the endoscopic surgery. Furthermore, the endoscopic surgery robot device 210 transmits images taken by the 3D camera to the controller 230, and controls the arms based on a control signal sent from the operation terminal 220 through the controller 230.

The operation terminal 220 includes a display which shows, as a stereoscopic image, an image (a surgical field of the patient) transmitted from the endoscopic surgery robot device 210 through the controller 230, an input device by which the arms and the 3D camera of the endoscopic surgery robot device 210 are operated, or the like. An input to the input device is transmitted, through the controller, to the endoscopic surgery robot device 210 in the form of a control signal. As described above, the controller 230 has a function of transmitting an image filmed by the endoscopic surgery robot device 210 to the operation terminal 220 and a function of transmitting a control signal from the operation terminal 220 to the endoscopic surgery robot device 210.

Furthermore, as shown in FIG. 13, in the present embodiment, the controller 230 has a function of synthesizing an image for left eye and an image for right eye filmed by the endoscopic surgery robot device 210 and generating a side-by-side or top-and-bottom 3D video. The 3D video generated by the controller 230 is encoded by the 3D real-time encoder 201 and sent to each 3D real-time decoder 101. With this arrangement, an image of the surgical field filmed by the endoscopic surgery robot system 200 can be viewed by the calibration system 100 real time.

In each calibration system 100, calibration data corresponding to a user who uses a head mounted display with a display A1 (see FIG. 11), etc. is stored in advance in a memory A3 (see FIG. 11). When the user watches a 3D video transmitted from the endoscopic surgery robot system 200 by using the calibration system 100, the calibration system 100 applies the calibration data in the memory A3 to the video to adjust images for left and right eyes to be appropriately positioned.

The calibration data of each user may be stored in another server, etc. In other words, the calibration system 100 may obtain the calibration data of a user from the server with reference to the login data of the user, and apply the data to a video.

With such a system including the above-described plural calibration systems 100 and the endoscopic surgery robot system 200, a 3D image of the surgical field in which the operations of the physician who is performing the endoscopic surgery are shown is shared between plural users. While surgery often takes long time, the calibration system 100 reduces a burden on the eyes. Images which are conventionally displayed on a flat screen are reproduced as remote-monitored but vivid 3d images through a network. This improves the effect and efficiency of the training for physicians, medial interns, and students who are studying robotic surgery.

The following will describe a third modification.

This modification relates to a technical field of readjustment of calibration for interpupillary distance which differs from person to person. The readjustment is suitable for VR (Virtual Reality).

For example, claim 4 of International Publication No. WO2016/069398 discloses an interpupillary distance adjusting mechanism by which user's interpupillary distance can be adjusted without taking a head set off from the user's head.

In the known technology, the adjustment is performed by hardware in accordance with the interpupillary distance of the user. The present inventor conceived of the modification through the study of various problems occurring when adjustment in accordance with the user's interpupillary distance was performed by software.

The modification aims at providing a calibration system and a calibration method, which solve a problem that, when a virtual focal distance varies in a 3D video watched by a user, even though adjustment suitable for the interpupillary distance of the user has been done by software before the change of the focal distance, the adjustment becomes not suitable for the interpupillary distance of the user after the change of the focal distance.

A calibration system of the modification includes:
a pair of VR goggles which is attached to the head of a human body and includes a display displaying an image for right eye and an image for left eye in order to show a 3D content for a user;
and
a controller,
the controller
obtains calibration data corresponding to a specific focal distance of the user using the pair of VR goggles,
changes display positions of the image for right eye and the image for left eye based on the calibration data so that a specific convergence angle suitable for the user is obtained, and shows the 3D content for the user,
obtains a focal distance of each scene of the 3D content, and when the focal distance of each scene is different from the specific focal distance, changes the display positions of the image for right eye and the image for left eye based on the focal distance of each scene and the calibration data so that a specific convergence angle suitable for the user is obtained in each scene, and shows the 3D content for the user.

A calibration method of the modification relates to a pair of VR goggles which is attached to the head of a human body and includes a display displaying an image for right eye and an image for left eye in order to show a 3D content for a user, and the method comprising the steps of: obtaining calibration data corresponding to an IPD and a specific focal distance of the user using the pair of VR goggles;
changing display positions of the image for right eye and the image for left eye based on the calibration data so that a specific convergence angle suitable for the user is obtained, and showing the 3D content for the user;
obtaining a focal distance of each scene of the 3D content; and
when the focal distance of each scene is different from the specific focal distance, changing the display positions of the image for right eye and the image for left eye based on the focal distance of each scene and the calibration data so that a specific convergence angle suitable for the user is obtained in each scene, and showing the 3D content for the user.

When the focal distance of an object varies in a 3D content, the object typically moves in an internal strabismus direction or a divergent strabismus direction in the image for right eye and the image for left eye. Because this moving distance depends on a change of the focal distance and the IPD suitable for VR goggles, the moving distance is not suitable for user whose IPDs are different from the IPD suitable for the VR goggles. According to the arrangement above, in accordance with a change in the focal distance, the image for right eye and the image for left eye are displayed at display positions determined based on the calibration data of the user using the VR goggles. With this arrangement, even when the IPD suitable for the VR goggles is different from that of the user using the VR goggles, the display positions of the image for right eye and the image for left eye are changed so that the convergence angle is suitable for each scene, and then the 3D content is shown.

The following will describe a specific arrangement of the modification.

Figure 14:
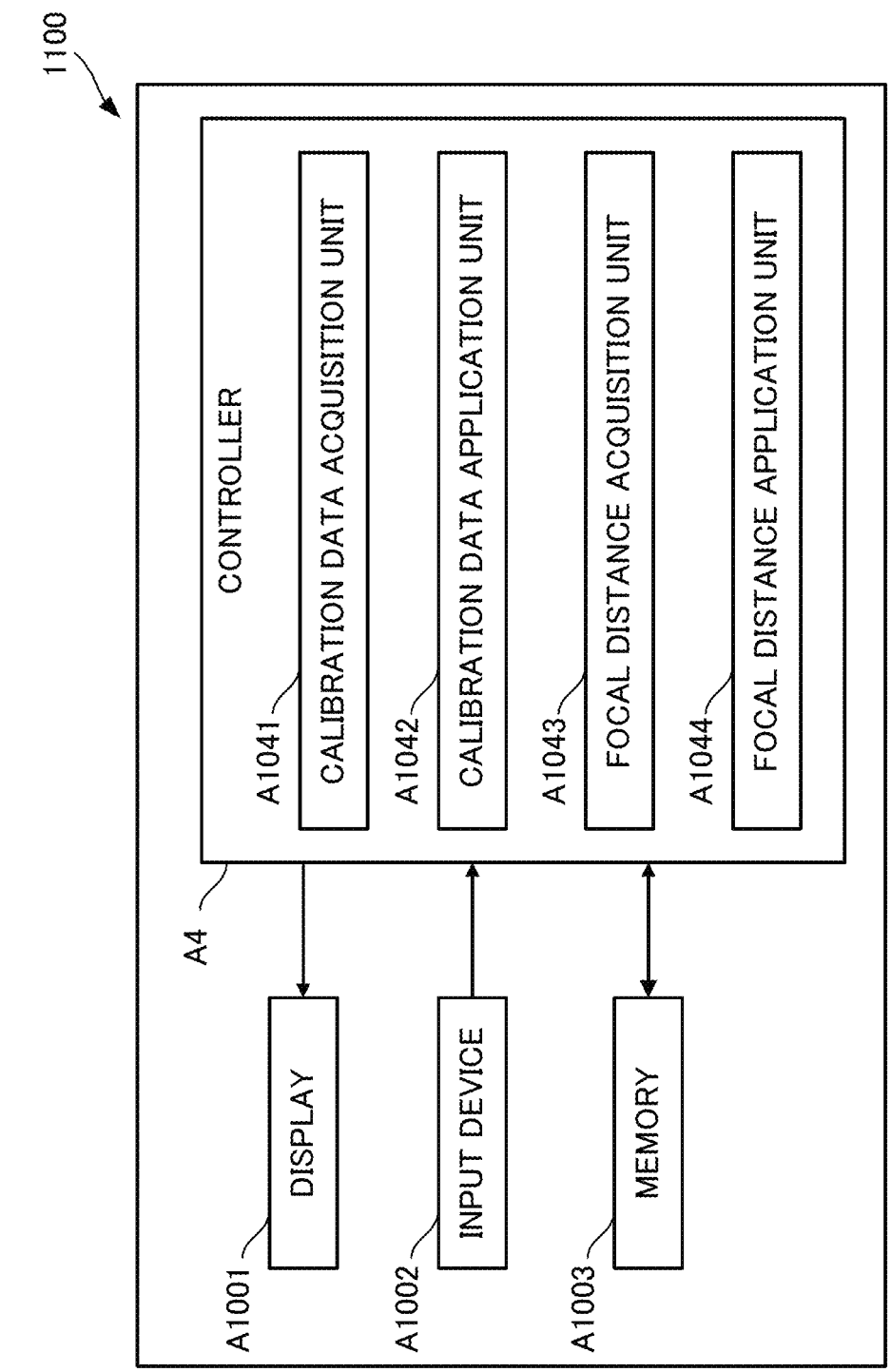
FIG. 14 is a block diagram of a calibration system of the second modification.

As shown in FIG. 14, a calibration system 1100 includes a display A1001, an input device A1002, a memory A1003, and a controller A1004. The display A1001 displays the above-described marker images M1 for left eye and marker images M2 for right eye, which are used for calibration, and the images for left eye and images for right eye for reproduction, to which the calibration is to be applied. The display A1001 may be provided for each of the right and left eyes, or may be a display of a smartphone.

The input device A1002 is used by the user to select a marker image M1 for left eye and a marker image M2 for right eye, which are visually matched for the user. For example, when a marker which is stared by the user for a predetermined time is selected as a selection target, the input device A1002 is a motion sensor, for example. Alternatively, the input device A1002 may be a typical mouse, keyboard, or a game controller.

The memory A1003 stores data of a 3D content to be displayed on the display A1001, such as the marker images M1 for left eye and marker images M2 for right eye, which are used for calibration, and the images for left eye and images for right eye for reproduction, to which the calibration is to be applied. The memory A1003 stores programs. The memory A1003 is a computer-readable non-transitory storage medium, and corresponds to, for example, a storage unit built in the head mounted display, a storage unit built in the smartphone, or a storage unit built in the server. When the head mounted display is connected to a computer which outputs VR video for a game, equipment for endoscopic surgery, an electron microscope, a driving simulator, and so on, the memory A1003 may be a storage unit built in the computer. In other words, the calibration system 1100 may include such a computer.

In addition to the above, the memory A1003 stores a focal distance associated with each scene of the 3D content. The focal distance may be stored as a value associated with each scene of the 3D content in advance, or a later-described focal distance acquisition unit A1043 acquires the focal distance by analyzing the 3D content.

The controller A1004 includes a calibration data acquisition unit A1041 which executes a process for acquiring calibration data of interpupillary distance described above, a calibration data application unit A1042 which executes a process of applying the calibration data to a video for VR reproduction, a focal distance acquisition unit A1043 which acquires the focal distance of each scene of the 3D content, and a focal distance application unit A1044 which sets display positions of an image for right eye and an image for left eye based on the acquired focal distance so that a suitable convergence angle is obtained.

The calibration data application unit A1042 may be a unit providing calibration data to the above-described computer which outputs VR videos. In this case, the computer applies the calibration data to the videos for VR reproduction. Furthermore, the calibration data application unit A42 may actually apply the calibration data to the VR videos output from the above-described computer. The focal distance acquisition unit A1043 may acquire a focal distance stored in the memory A1003 in accordance with each scene of a 3D content as described above, or may acquire a focal distance from the 3D content. The focal distance application unit A1044 sets the display positions of an image for right eye and an image for left eye based on the calibration data acquired by the calibration data acquisition unit A1041 and the focal distance acquired by the focal distance acquisition unit A1043.

Now, the following will describe a problem which occurs when the focal distance is changed for a user of a pair of VR goggles, whose IPD is different from the IPD set to the pair of VR goggles. In this case, the IPD of the user is wider than the IPD set to the pair of VR goggles.

Figure 15A:
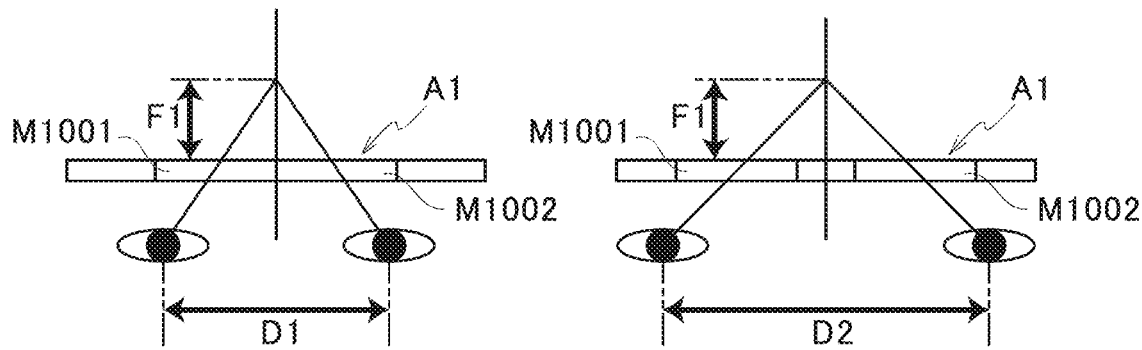
FIG. 15A illustrates an example in which a user whose interpupillary distance is wider than the interpupillary distance set to VR goggles uses the VR goggles.

As shown in FIG. 15A, before a 3D content is provided, calibration data is acquired by using a marker image M1 for left eye and a marker image M2 for right eye which are virtually positioned at a predetermined focal distance F1 in advance, and the display positions of an image M1001 for left eye and an image M1002 for right eye are changed so that a specific convergence angle suitable for the user is attained, then the 3D content is displayed as described in the embodiment above.

To be more specific, for a user who has an interpupillary distance D2 which is wider than an interpupillary distance D1 set to the pair of VR goggles, a marker image M1001 for left eye and a marker image M1002 for right eye are displayed at positions shifted in a divergent strabismus direction.

Figure 15B:
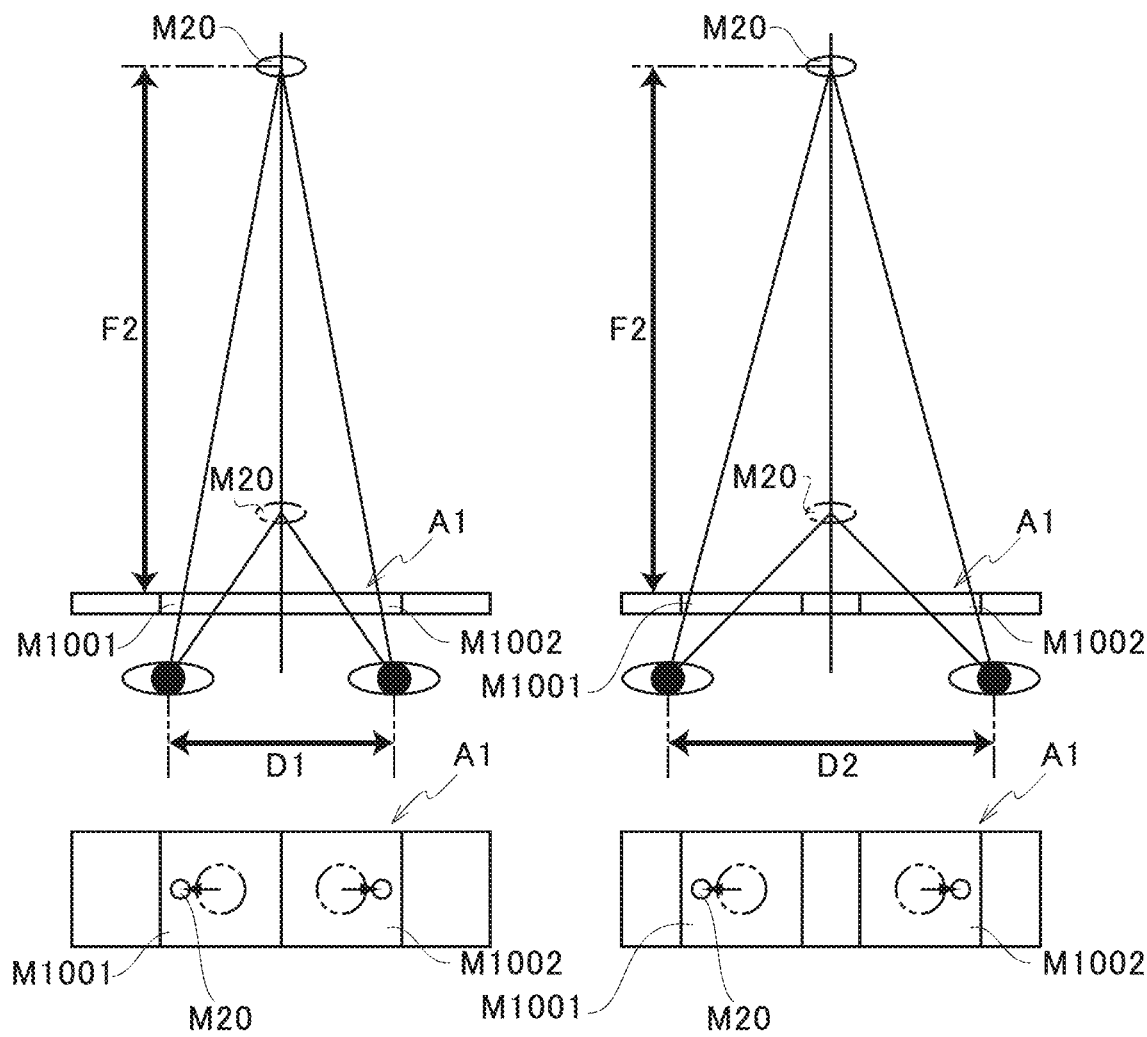
FIG. 15B illustrates the example in which the user whose interpupillary distance is wider than the interpupillary distance set to VR goggles uses the VR goggles.

When, for example, as shown in FIG. 15B, an object M20 virtually positioned at a focal distance D1 is moved to a position at a focal distance D2, objects M20 in the image M1001 for left eye and the image M1002 for right eye on the display A1 are moved by the same distance in the divergent strabismus direction, irrespective of the application of the calibration data. The positions of the moved objects M20 are suitable for a user having the interpupillary distance D1 set to the pair of VR goggles, but are not suitable for the user having the interpupillary distance D2 wider than the interpupillary distance D1 set to the pair of VR goggles, with the result that a burden is on the eyes of the latter user.

In this modification, in order to solve the above-described problem occurring in VR goggles with a fixed convergence distance, when the focal distance is changed, the positions of the image M1001 for left eye and the image M1002 for right eye on the display A1 are moved in the divergent strabismus direction or the internal strabismus direction so that the positions become suitable for the IPD of the user. For example, in the example above, the image M1001 for left eye and the image M1002 for right eye are shifted in the divergent strabismus direction.

The following will describe how the calibration system 1100 works. In the modification, as shown in FIG. 16, a focal distance corresponding to each scene of a 3D content is stored in the memory A1003.

To be more specific, as shown in FIG. 16, the memory A1003 stores a focal distance table. The focal distance table has a scene column and a focal distance column. Scenes of the 3D content are stored in the scene column. Focal distances corresponding to the respective scenes are stored in the focal distance column. The focal distance indicates a focal distance at which an object which is primarily shown to the user is virtually provided. The focal distance may not be a virtual distance, and may be information calculated based on a focal distance.

Referring to FIG. 17, the following will describe a program of a readjustment process during the reproduction of a 3D content, which is executed by the calibration system 1100.

As shown in FIG. 17, to begin with, the calibration system 1100 reproduces a 3D content with calibration data (S1). A flow of acquiring the calibration data is omitted. The calibration system 1100 then determines whether a scene is changed in the 3D content (S2). When a scene is changed (YES in S2), the calibration system 1100 acquires a focal distance corresponding to the scene, with reference to the focal distance table (see FIG. 16) (S3). The calibration system 1100 then calculates the shift distance of each image by, for example, stereo matching, in accordance with the calibration data and the acquired focal distance (S4). An image M1001 for left eye and an image M1002 for right eye are shifted in the divergent strabismus direction or the internal strabismus direction by the calculated shift distance.

When no scene is changed in the step S2 (NO in S2) or after the execution of the step S5, the calibration system 1100 determines whether the user has made an adjustment request for performing adjustment again (S6). When no adjustment request has been made (NO in S6), the calibration system 1100 proceeds to the step S2. When the adjustment request has been made (YES in S6), the calibration system 1100 temporarily stops the reproduction of the 3D content, and displays marker images for adjustment (e.g., marker images M1 for left eye and marker images M2 for right eye shown in FIG. 4 and FIG. 5) (S7). The calibration system 1100 then determines whether the user has select any marker image (S8). When no marker image is selected (NO in S8), the calibration system 1100 repeatedly executes the step S8.

When a marker image has been selected (YES in S8), the calibration system 1100 updates the calibration data based on the selected marker image (S9). The calibration system 1100 then resumes the reproduction of the 3D content with the calibration data (S10). To be more specific, when the image M1001 for left eye and the image M1002 for right eye have been shifted based on a change of the focal distance, the positions of the image M1001 for left eye and the image M1002 for right eye are changed to the positions based on the updated calibration data, and the shifting is carried out in accordance with the change of the focal distance.

The calibration system 1100 then determines whether the reproduction of the 3D content has been finished (S11). When the reproduction of the 3D content has not been finished (NO in S11), the calibration system 1100 proceeds to the step S2. When the reproduction of the 3D content has been finished (YES in S11), the calibration system 1100 terminates the process.

The above embodiment thus described solely serves as a specific example of the present invention, and the present invention is not limited to such an example. Specific structures and various units may be suitably designed or modified. Further, the effects described in the embodiment of the present invention described in the above embodiment are no more than examples of preferable effects brought about by the present invention, and the effects of the present invention are not limited to those described hereinabove.

Further, the detailed description above is mainly focused on characteristics of the present invention to for the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in this specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

The present invention performs, by means of software, calibration of interpupillary distance which may vary person to person or may vary depending on age, and displays images for left and right eyes suitable for each person on a display. This suppresses the occurrence of various problems which occur when a person views stereoscopic images by parallax. The invention is especially suitable for a program of acquiring calibration data for VR goggles with which VR video is easily enjoyable by using a display of a smartphone and a gyro function, and hence the invention is susceptible of industrial application.

What is claimed is:

1. A computer-readable non-transitory storage medium storing a calibration program of an interpupillary distance for executing calibration of the interpupillary distance, the calibration program causing an image processor provided in a pair of VR (Virtual Reality) goggles which is mounted on a head of a human body to execute:
displaying a plurality of marker images at a plurality positions, respectively, each of the plurality of marker images including a right image for right eye and a left image for left eye to be overlapped when being visually recognized, and a deviation between the right image and the left image is different for the plurality of marker images when being visually recognized;
selecting a marker image, which is stared for a predetermined time, from among the plurality of marker images;
setting calibration data of the interpupillary distance based on the selected marker image;
adjusting positions of a content image for right eye and a content image for left eye based on the calibration data;
displaying, as a three-dimensional (3D) content, the content image for right eye and the content image for left eye whose positions are adjusted;
displaying the plurality of marker images again when a request for performing adjustment is received while displaying the 3D content;
setting the calibration data of the interpupillary distance again based on a marker image which is selected again from among the plurality of marker images; and
displaying, as the 3D content, the content image for right eye and the content image for left eye whose positions are adjusted based on the calibration data which is set again.

2. The computer-readable non-transitory storage medium of claim 1, wherein the adjusting the positions comprises shifting the positions in a horizontal direction based on the calibration data.

3. The computer-readable non-transitory storage medium of claim 2, wherein the shifting the positions in the horizontal direction comprises shifting the position of the content image for right eye in a first direction and the position of the content image for left eye in a second direction opposite to the first direction by a distance based on the calibration data.

4. The computer-readable non-transitory storage medium of claim 1, wherein the displaying the plurality of marker images comprises displaying the plurality of marker images in a 360-degree VR space.

5. The computer-readable non-transitory storage medium of claim 4, wherein the displaying the plurality of marker images comprises displaying the plurality of marker images in a scrolling manner in the 360-degree VR space based on a movement detection signal from a sensor that is included in the image processor and performs a head tracking function.

6. A calibration method for executing calibration of an interpupillary distance, performed by an image processor provided in a pair of VR (Virtual Reality) goggles which is mounted on a head of a human body, the calibration method comprising:
displaying a plurality of marker images at a plurality positions, respectively, each of the plurality of marker images including a right image for right eye and a left image for left eye to be overlapped when being visually recognized, and a deviation between the right image and the left image is different for the plurality of marker images when being visually recognized;
selecting a marker image, which is stared for a predetermined time, from among the plurality of marker images;
setting calibration data of the interpupillary distance based on the selected marker image;
adjusting positions of a content image for right eye and a content image for left eye based on the calibration data;
displaying, as a three-dimensional (3D) content, the content image for right eye and the content image for left eye whose positions are adjusted;
displaying the plurality of marker images again when a request for performing adjustment is received while displaying the 3D content;
setting the calibration data of the interpupillary distance again based on a marker image which is selected again from among the plurality of marker images; and displaying, as the 3D content, the content image for right eye and the content image for left eye whose positions are adjusted based on the calibration data which is set again.

7. The calibration method of claim 6, wherein the adjusting the positions comprises shifting the positions in a horizontal direction based on the calibration data.

8. The calibration method of claim 7, wherein the shifting the positions in the horizontal direction comprises shifting the position of the content image for right eye in a first direction and the position of the content image for left eye in a second direction opposite to the first direction by a distance based on the calibration data.

9. The calibration method of claim 6, wherein the displaying the plurality of marker images comprises displaying the plurality of marker images in a 360-degree VR space.

10. The calibration method of claim 9, wherein the displaying the plurality of marker images comprises displaying the plurality of marker images in a scrolling manner in the 360-degree VR space based on a movement detection signal from a sensor that is included in the image processor and performs a head tracking function.

* * * * *